US009473911B2

(12) United States Patent
Kim et al.

(10) Patent No.: US 9,473,911 B2
(45) Date of Patent: Oct. 18, 2016

(54) METHOD AND DEVICE FOR DELIVERING MESSAGES

(75) Inventors: Laeyoung Kim, Anyang-si (KR); Taehyeon Kim, Anyang-si (KR); Hyunsook Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 162 days.

(21) Appl. No.: 14/129,863

(22) PCT Filed: May 30, 2012

(86) PCT No.: PCT/KR2012/004235
§ 371 (c)(1),
(2), (4) Date: Dec. 27, 2013

(87) PCT Pub. No.: WO2013/002493
PCT Pub. Date: Jan. 3, 2013

(65) Prior Publication Data
US 2014/0133399 A1    May 15, 2014

Related U.S. Application Data

(60) Provisional application No. 61/502,864, filed on Jun. 30, 2011.

(30) Foreign Application Priority Data

Apr. 24, 2012   (KR) .................. 10-2012-0042824

(51) Int. Cl.
*H04W 4/14* (2009.01)
*H04L 29/06* (2006.01)
*H04W 76/02* (2009.01)

(52) U.S. Cl.
CPC ............ *H04W 4/14* (2013.01); *H04L 65/1006* (2013.01); *H04L 65/1016* (2013.01); *H04L 65/1073* (2013.01); *H04W 76/021* (2013.01)

(58) Field of Classification Search
CPC . H04L 12/063; H04L 12/2834; H04L 12/58; H04L 12/581; H04L 12/5835; H04L 12/5895; H04L 12/589; H04L 12/66; H04L 51/066; H04L 51/36; H04L 51/04; H04L 65/1016; H04L 69/08; H04W 4/18; H04W 4/14; H04W 4/12; H04W 88/184

See application file for complete search history.

(56) References Cited

U.S. PATENT DOCUMENTS

| 6,366,576 | B1* | 4/2002 | Haga ........................... 370/352 |
| 6,611,516 | B1* | 8/2003 | Pirkola et al. .............. 370/352 |
| 2005/0180403 | A1 | 8/2005 | Haddad et al. |
| 2006/0053379 | A1* | 3/2006 | Henderson et al. .......... 715/751 |

(Continued)

FOREIGN PATENT DOCUMENTS

| EP | 2056612 A1 * | 5/2009 |
| JP | 2005-526470 A | 9/2005 |

(Continued)

OTHER PUBLICATIONS

3GPP, Technical Specification 29.228, Technical Specification Group Core Network and Terminals, IP Multimedia (IM) Subsystem Cx and Dx Interfaces, (Release 11), Jun. 2011, 3GPP, V11.0.0.*

(Continued)

*Primary Examiner* — Michael Thier
*Assistant Examiner* — Eric Nowlin
(74) *Attorney, Agent, or Firm* — Birch, Stewart, Kolasch & Birch, LLP

(57) ABSTRACT

A method for interworking messages of heterogeneous, and which includes acquiring a temporary identifier of the sending terminal when the sending terminal is a terminal that subscribes in an IP multimedia subsystem (IMS) without a mobile communication global unique number, in which the temporary identifier is an identifier used for transmitting a short message during an IMS registration valid period of the sending terminal; receiving a session initiation protocol (SIP) based message transmitted by the sending terminal from an IMS based session controller; acquiring a temporary identifier of a receiving terminal based on an SIP based identifier of the receiving terminal encapsulated in the SIP based message; and generating a short message service (SMS) based message based on the received SIP based message, the temporary identifier of the receiving terminal, and the temporary identifier of the transmitting terminal.

10 Claims, 18 Drawing Sheets

(56) References Cited

U.S. PATENT DOCUMENTS

| | | | | |
|---|---|---|---|---|
| 2006/0281447 | A1* | 12/2006 | Lewis | H04M 3/42042 455/418 |
| 2007/0243876 | A1* | 10/2007 | Duan | H04W 4/14 455/445 |
| 2008/0182548 | A1* | 7/2008 | Pattison | H04L 69/08 455/406 |
| 2009/0049202 | A1* | 2/2009 | Pattison et al. | 709/249 |
| 2009/0129372 | A1* | 5/2009 | Pandey et al. | 370/352 |
| 2009/0131022 | A1* | 5/2009 | Buckley et al. | 455/412.1 |
| 2009/0156181 | A1* | 6/2009 | Athsani et al. | 455/414.2 |
| 2010/0069095 | A1* | 3/2010 | Yahav et al. | 455/466 |
| 2010/0222091 | A1* | 9/2010 | Shaheen | H04L 12/5895 455/466 |
| 2011/0053579 | A1* | 3/2011 | Montaner Gutierrez | H04W 4/14 455/418 |
| 2011/0080905 | A1* | 4/2011 | Greene | H04L 51/066 370/352 |
| 2012/0117166 | A1* | 5/2012 | Sharma | 709/206 |
| 2012/0236797 | A1* | 9/2012 | Lindholm | H04W 8/26 370/328 |
| 2012/0275442 | A1* | 11/2012 | Malets | H04W 4/16 370/338 |
| 2014/0113668 | A1* | 4/2014 | Duan | H04W 4/14 455/466 |

FOREIGN PATENT DOCUMENTS

| | | |
|---|---|---|
| KR | 10-2006-0106328 A | 10/2006 |
| KR | 10-0785235 B1 | 12/2007 |
| WO | WO 03/103308 A1 | 12/2003 |
| WO | WO 2013004300 A2 * | 1/2013 |

OTHER PUBLICATIONS

3GPP, Technical Specification 23.204, Technical Specification Group Services and System Aspects, Support of Short Message Service (SMS) over generic 3GPP Internet Protocol (IP) Access (Release 11), Stage 2, Jun. 2011, 3GPP, V.11.0.0.*

3GPP TSG SA WG2 Meeting #79, TD S2-102425, SIP URIs for devices without MSISDN, 3GPP, May 10-14, 2010, 3GPP.*

SA WG2 Meeting #88 S2-114816, Key Issue: How to carry MSISDN-less IMS UE SIP URI in SMSIP Origination, Nov. 14-18, 2011, 3GPP.*

3GPP, SA WG2 Meeting #90, S2-121506, UE to UE delivery in IMS without MSISDN, Apr. 16-20, 2012, 3GPP.*

3GPP, 3GPP TSG SA Meeting #54 TD SP-110759, TR 23.863, Version 1.0.0: Support of Short Message Service (SMS) in IMS without MSISDN; Stage 2 (Release 11), Dec. 12-14, 2011, 3GPP.*

* cited by examiner (a)

(b)

METHOD AND DEVICE FOR DELIVERING MESSAGES

CROSS REFERENCE TO RELATED APPLICATIONS

This application is the National Phase of PCT/KR2012/004235 filed on May 30, 2012, which claims priority under 35 U.S.C. 119(e) to U.S. Provisional Application No. 61/502,864 filed on Jun. 30, 2011 and under 35 U.S.C. 119(a) to Patent Application No. 10-2012-0042824 filed in Korea on Apr. 24, 2012, all of which are hereby expressly incorporated by reference into the present application.

TECHNICAL FIELD

The specification relates to a method and an apparatus for a terminal without an MSISDN associated with IMS subscriber information to transmit and receive a short message.

BACKGROUND ART

A 3GPP that establishes a technology standard of a $3^{rd}$ generation mobile communication system has started a research into long term evolution/system architecture evolution (LTE/SAE) technology as part of an effort to optimize and improve performance of 3 GPP technologies from the end of 2004 in order to cope with various forums and new technologies associated with $4^{th}$ generation mobile communication.

SAE that is progressed around 3GPP SA WG2 is a research into network technology to determine a structure of a network with an LTE work of a 3GPP TSG RAN and support mobility between model networks and one of key standardization issues of the 3GPP. This is a work for developing a 3GPP system to a system that supports various wireless access technologies based on an IP and the work has been progressed for the purpose of an optimized packet based system that minimizes a transmission delay with a further improved data transmission capability.

An SAE higher-level reference model defined in the 3GPP SA WG2 includes a non-roaming case and a roaming case of various scenarios, and a detailed content may be referred in TS 23.401 and TS 23.402 which are 3GPP standard documents.

FIG. 1 is a structural diagram of an evolved mobile communication network.

One of largest features of the network structure of FIG. 1 is based on a 2 tier model of eNodeB of an evolved UTRAN and a gateway of a core network and although accurately coincides with each other, the eNodeB 920 has functions of NodeB and RNC of an existing UMTS system and the gateway has an SGSN/GGSN function of the existing system.

Another key feature is that a control plane and a user plane between an access network and the core network are switched to different interfaces. In the existing UMTS system, one Iu interface exists between an RNC and an SGSN, while a mobility management entity (MME) 951 that undertakes processing of a control signal has a structure separated from a gateway (GW), and as a result, two interfaces of S1-MME and S1-U are respectively used. The GW includes a serving-gateway (hereinafter, referred to as 'S-GW') 952 and a packet data network gateway (hereinafter, referred to as 'PDN-GW' or 'P-GW') 953.

FIG. 2 is a diagram illustrating the relationship between (e)NodeB and Home (e)NodeB.

In the $3^{rd}$ or $4^{th}$ mobile communication system, an attempt to increase a cell capacity is continuously made in order to support a high-capacity service and a bidirectional service such as multimedia contents, streaming, and the like.

That is, as various large-capacity transmission technologies are required with development of communication and spread of multimedia technology, a method for increase a radio capacity includes a method of allocating more frequency resources, but there is a limit in allocating more frequency resources to a plurality of users with limited frequency resources.

An approach to use a high-frequency band and decrease a cell radius has been made in order to increase the cell capacity. When a cell having a small radius, such as a pico cell is adopted, a band higher than a frequency used in the existing cellular system may be used, and as a result, it is possible to transfer more information. However, since more base stations should be installed in the same area, higher cost is required.

In recent years, a femto base station such as a Home (e)NodeB 930 has been proposed while making the approach to increase the cell capacity by using the small cell.

The Home (e)Node 930 has been researched based on a RAN WG3 of the 3GPP Home (e)NodeB and in recent years, the Home (e)NodeB 30 has been in earnest researched even in an SA WG.

The (e)NodeB 920 illustrated in FIG. 2 corresponds to a macro base station and the Hoem (e)NodeB 930 illustrated in FIG. 2 may correspond to the femto base station. In the specification, (e)NodeB intends to be described based on terms of the 3GPP and (e)NodeB is used when NodeB and eNodeB are mentioned together. Further, Home (e)NodeB is used when Home NodeB and Home eNodeB are mentioned together.

The (e)NodeB 920 transmits and receives signals of the MME 951 and the control plane and transmits and receives signals of the S-GW 952 and the user plane. Similarly, the (e)NodeB 930 also transmits and receives signals of the MME 951 and the control plane and transmits and receives data of the S-GW 952 and the user plane. The PDN-GW 953 serves to transmit and receive the data from the S-GW 952 to an IP service network of a mobile communication provider.

Interfaces marked with dotted lines are used to transmit control signals among the (e)NodeB 920, the Home (e)NodeB 930, and then MME 951. In addition, interfaces marked with solid lines are used to transmit the data of the user plane.

FIG. 3 is an exemplary diagram illustrating a structure of a network including a Home Node and a Home (e)NodeB.

As illustrated in FIG. 3A, a core network 950 includes the MME 951, the serving gateway (S-GW) 952, an SGSN 956, and a packet data network gateway (P-GW) 953. Besides, the core network 950 may further include a PCRF 954 and an HSS 955.

FIG. 3A illustrates the Home NodeB 931 by a UMTS terrestrial radio access network (UTRAN) and the Home eNodeB 932 by an evolved-UTRAN (E-UTRAN). The Home NodeB 931 by the UTRAN is connected with the SGSN 956 through a gateway 935. The Home eNodeB 932 by the E-UTRAN is connected with the MME 951 and the S-GW 952. In this case, the control signal is transferred to the MME 951 and the user data signal is transferred to the S-GW 952. Further, the gateway 935 may be present between the Home eNodeB 932 by the E-UTRAN and the MME 951.

Meanwhile, referring to FIG. 3B, an interface of the Home eNodeB 932 by the E-UTRAN is illustrated. The Home eNodeB 932 by the E-UTRAN and the gateway 935 are called a Home eNodeB subsystem. The Home eNodeB 932 by the E-UTRAN is connected with a UE 910 through an LTE-Uu interface. The Home eNodeB 932 and the MME 951 are connected through an S1-MME interface. In addition, the Home eNodeB 932 and the S-GW 952 are connected through an S1-U interface. In this case, the S1-MME interface and the S1-U interface may pass through the gateway 935. The MME 951 and the S-GW 952 are connected through an S11 interface. In addition, the MME 951 and the HSS 955 are connected through an S6a interface.

FIG. 4 is an exemplary diagram illustrating an interface between he Home eNodeB and the MME illustrated in FIG. 3.

As illustrated in FIG. 4, each of the Home eNodeB 932 and the MME 951 includes a first layer (physical layer), a second layer (medium connection control layer), a third layer (Internet protocol (IP) layer), a signaling control transmission protocol (SCTP), and an S1 application protocol (S1-AP).

The S1-AP is an application layer protocol between the Home eNodeB 932 and the MME 951. The STCP assures transferring of a signaling message between the Home eNodeB 932 and the MME 951.

FIGS. 5a and 5b are general structural diagrams of an IP-connectivity access network (IP-CAN) that provides a short message.

Referring to FIG. 5a, an IP-short-message-gateway (IP-SM-GW) performs protocol interworking in order to transmit and receive a short message of an IP based terminal. That is, when the IP-SM-GW receives an SIP message including short message service associated information (for example, a mobile originated short message), a delivery report, and the like, the IP-SM-GW extracts and delivers the SMS associated information. In this case, a protocol used in communication between an MSC or an SGSN and an SMS-GMSC/SMS-IWMSC is applied under the existing GSM/UMTS environment. On the contrary, when the IP-SM-GW receives from the SMS-GMSC/SMS-IWMSC SMS associated information (for example, a mobile terminated short message, a submit report, and the like) toward the IP based terminal, the information contained in the SIP message is delivered to the IP based terminal. In this case, a protocol used in communication between an MSC or an SGSN and an SMS-GMSC/SMS-IWMSC is applied under the existing GSM/UMTS environment.

The SMS associated information is included in a transfer protocol data unit (TPDU) transferred through a short message transfer layer (SM-TL) of FIG. 5b and the TPDU is encapsulated in a relay protocol data unit transferred through a short message relay layer (SM-RL) to be transferred.

DISCLOSURE

Technical Problem

As described above in an operation of the related art, since space among an IP-SM-GW, an IMS core, and an IP based terminal is an SIP section, even though a mobile subscriber integrated services digital network number (MSISDN) of the IP based terminal associated with IMS subscriber information is not present, an SMS associated message can be switched. However, other sections, that is, in a section between the IP-SM-GW and the SMS-GMSC/SMS-IWMSC and a section between the IP-SM-GW and an HSS, the MSISDN is required.

Therefore, in order for the IP based terminal to send and receive a short message to and from other UEs, the MSISDN associated with IMS subscriber information to which the IP based terminal belongs is required. A more detailed description can be known with reference to 3GPP TS 23.204.

In recent years, an interest in a possibility and an incrementality of a user who just subscribes in a packet switched data network without the MSISDN has been concentrated and a method for the users to use an SMS is required.

DISCLOSURE OF THE INVENTION

In order to achieve the aforementioned object, the present invention provides a method in which a gateway interworking messages of heterogeneous protocols for a sending terminal processes a message. The method may comprise: acquiring a temporary identifier of the sending terminal when the sending terminal is a terminal that subscribes in an IP multimedia subsystem (IMS) without a mobile communication global unique number, wherein the temporary identifier is an identifier used for transmitting a short message during an IMS registration valid period of the sending terminal; receiving a session initiation protocol (SIP) based message transmitted by the sending terminal from an IMS based session controller; acquiring a temporary identifier of a receiving terminal based on an SIP based identifier of the receiving terminal encapsulated in the SIP based message; generating a short message service (SMS) based message based on the received SIP based message, the temporary identifier of the receiving terminal, and the temporary identifier of the transmitting terminal; and transmitting the generated SMS based message to a switcher.

The generating of the SMS based message may include: decapsulating the SMS based message encapsulated in the received SIP based message; and adding the temporary identifier of the receiving terminal and the temporary identifier of the sending terminal to the decapsulated SMS based message.

In the acquiring of the temporary identifier of the sending terminal, a home subscriber server of the sending terminal receives a temporary identifier allocated through an IMS registration procedure.

In the acquiring of the temporary identifier of the sending terminal, the IMS based session controller receives the temporary identifier allocated through the IMS registration procedure.

In the acquiring of the temporary identifier of the sending terminal, the gateway allocates the temporary identifier through the IP multimedia subsystem (IMS) registration procedure.

The temporary identifier may include a country code (CC) field, a national destination code (NDC) field, and a subscriber number (SN) field, and the SN field may be generated arbitrarily or sequentially or based on an instance ID transmitted which the sending terminal transmits in IMS registration or based on subscriber information of the sending terminal.

The NDC field may be generated differently for each gateway.

The temporary identifier may be generated based on an international mobile subscriber identity (IMSI) or an integrated circuit card ID (ICCID) of the terminal.

In the acquiring of the temporary identifier of the receiving terminal, the gateway may receive the temporary identifier from a home subscriber server of the receiving terminal.

In the acquiring of the temporary identifier of the receiving terminal, the gateway may receive the temporary identifier from the IMS based session controller, and the IMS based session controller may receive the temporary identifier the home subscriber server of the receiving terminal.

The IMS based session controller may be a serving-call session control function (S-CSCF).

The mobile communication global unique number may be a mobile subscriber integrated services digital number (MSISDN).

The present invention provides a method in which a gateway interworking messages of heterogeneous protocols for a receiving terminal that subscribes in an IP multimedia subsystem (IMS) without a mobile communication global unique number processes a message. The method may comprise: receiving an SMS based message from a switcher; acquiring identification information of a sending terminal based on a temporary identifier of the sending terminal, which is encapsulated in the SMS based message, the temporary identifier being an identifier used for transmitting a short message during an IMS registration valid period of the sending terminal; generating a session initiation protocol (SIP) based message based on the received SMS based message and the identification information of the sending terminal; and transmitting the generated SIP based message to an IMS based session controller.

The generating of the SIP based message may include: encapsulating the received SMS based message in the SIP based message; and adding the identification information of the sending terminal to the encapsulated SIP based message.

In the acquiring of the identification information of the sending terminal, the gateway may receive the identification information from a home subscriber server of the sending terminal.

The identification information of the sending terminal may be an SIP uniform resource identifier (URI).

The IMS based session controller may be a serving-call session control function (S-CSCF).

The mobile communication global unique number may be a mobile subscriber integrated services digital number (MSISDN).

There is provided a gateway interworking messages of heterogeneous protocols for a sending terminal. the gateway may comprise: a transmitting/receiving unit for transmitting/receiving a signal to/from the outside; and a control unit connected with the transmitting/receiving unit, wherein the control unit is configured to control the transmitting/receiving unit to acquire a temporary identifier of the sending terminal when the sending terminal is a terminal that subscribes in an IP multimedia subsystem (IMS) without a mobile communication global unique number, the temporary identifier being an identifier used for transmitting a short message during an IMS registration valid period of the sending terminal; control the transmitting/receiving unit to receive a session initiation protocol (SIP) based message transmitted by the sending terminal from an IMS based session controller; control the transmitting/receiving unit to acquire a temporary identifier of a receiving terminal based on an SIP based identifier of the receiving terminal encapsulated in the SIP based message, generate a short message service (SMS) based message based on the received SIP based message, the temporary identifier of the receiving terminal, and the temporary identifier of the transmitting terminal; and control the transmitting/receiving unit to transmit the generated SMS based message to a switcher.

The control unit may be configured to decapsulate the SMS based message encapsulated in the received SIP based message, and add the temporary identifier of the receiving terminal and the temporary identifier of the sending terminal to the decapsulated SMS based message to generate the SMS based message.

There is provided a gateway interworking messages of heterogeneous protocols for a receiving terminal. The gateway may comprise: a transmitting/receiving unit for transmitting/receiving a signal to/from the outside; and a control unit connected with the transmitting/receiving unit. The control unit may be configured to control the transmitting/receiving unit to receive an SMS based message from a switcher; control the transmitting/receiving unit to acquire identification information of a sending terminal based on a temporary identifier of the sending terminal, which is encapsulated in the SMS based message, the temporary identifier being an identifier used for transmitting a short message during an IMS registration valid period of the sending terminal; generate a session initiation protocol (SIP) based message based on the received SMS based message and the identification information of the sending terminal, and control the transmitting/receiving unit to transmit the generated SIP based message to an IMS based session controller.

According to embodiments of the present invention, the present invention has an advantage that a terminal that does not have an MSISDN associated with IMS subscriber information can transmit and receive an IP based short message.

MODES FOR CARRYING OUT THE PREFERRED EMBODIMENTS

Figure 1:
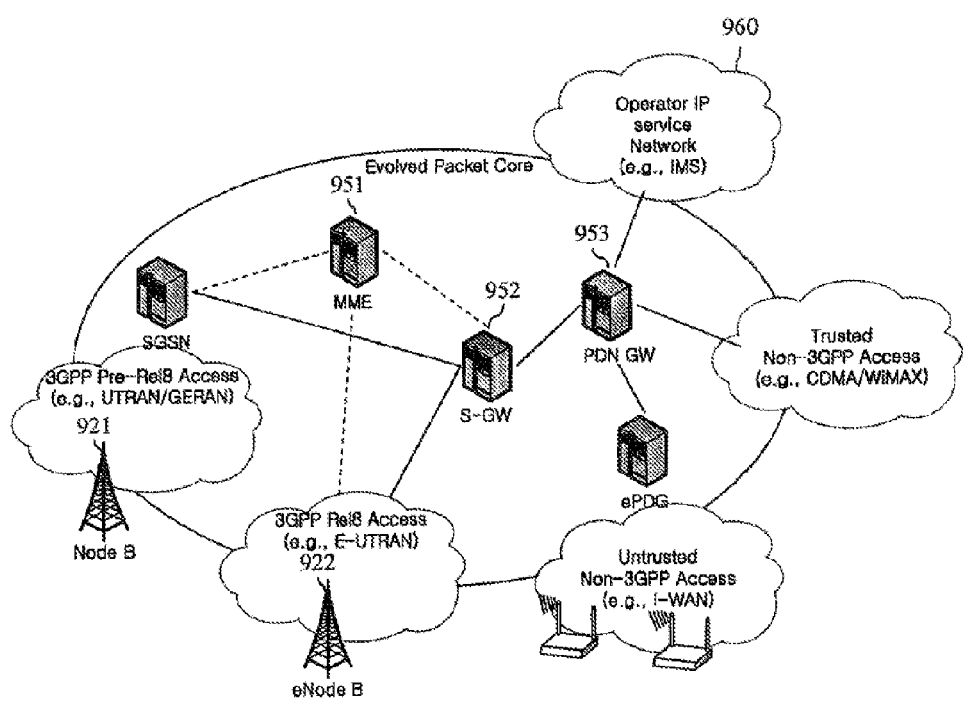
FIG. 1 is a structural diagram of an evolved mobile communication network.
Figure 2:
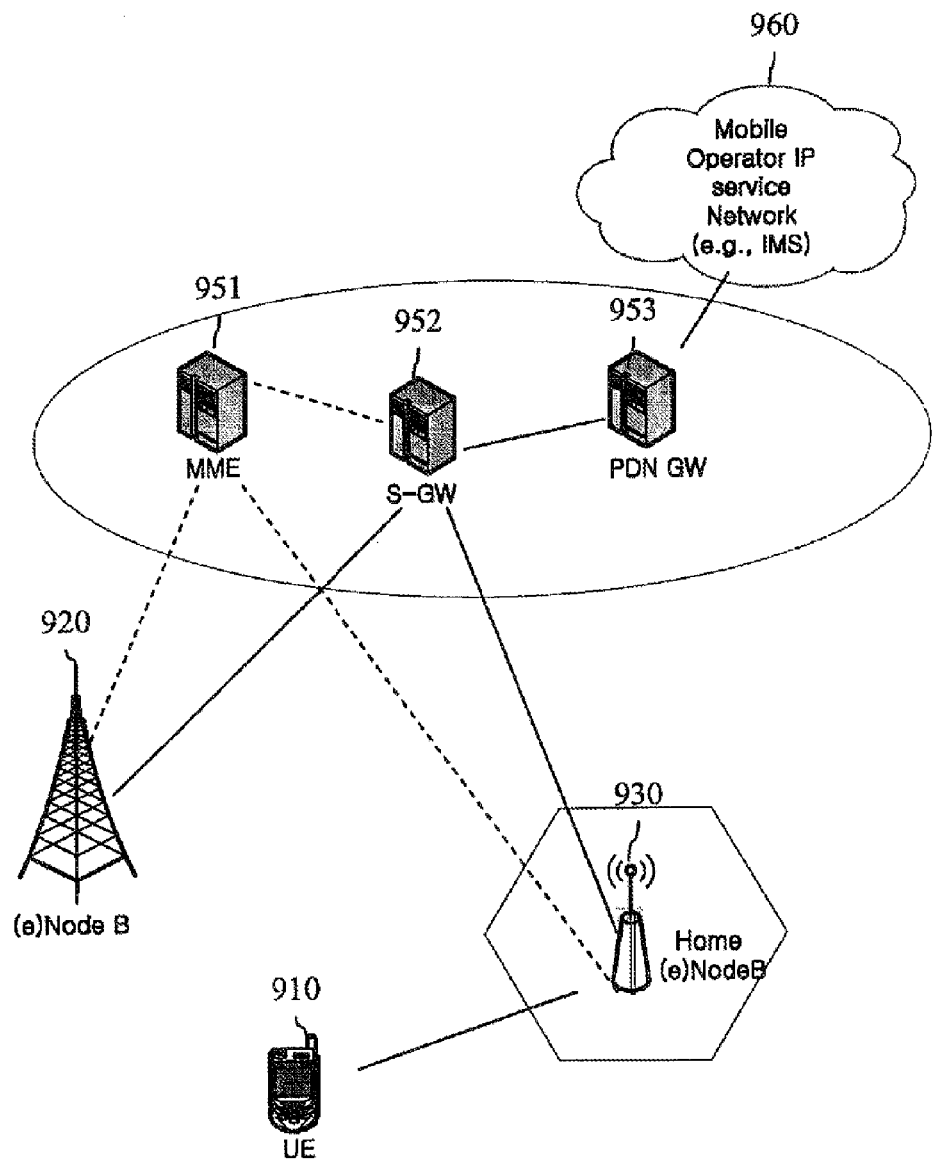
FIG. 2 is a diagram illustrating a relationship between (e)NodeB and Home (e)NodeB.
Figure 3:
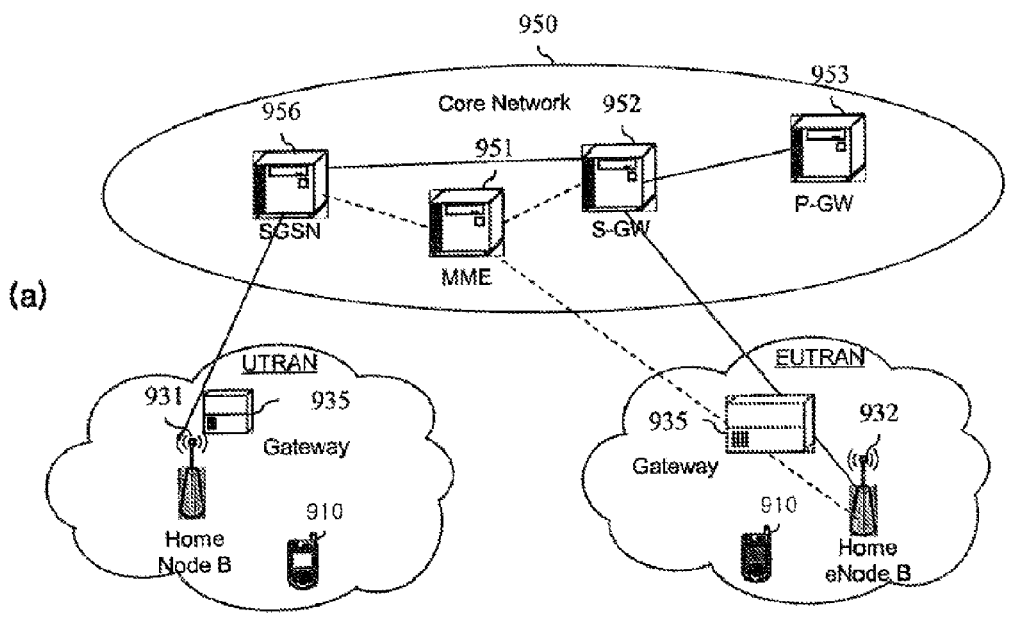
FIG. 3 is an exemplary diagram illustrating a structure of a network including a Home Node and a Home (e)NodeB.
Figure 3:
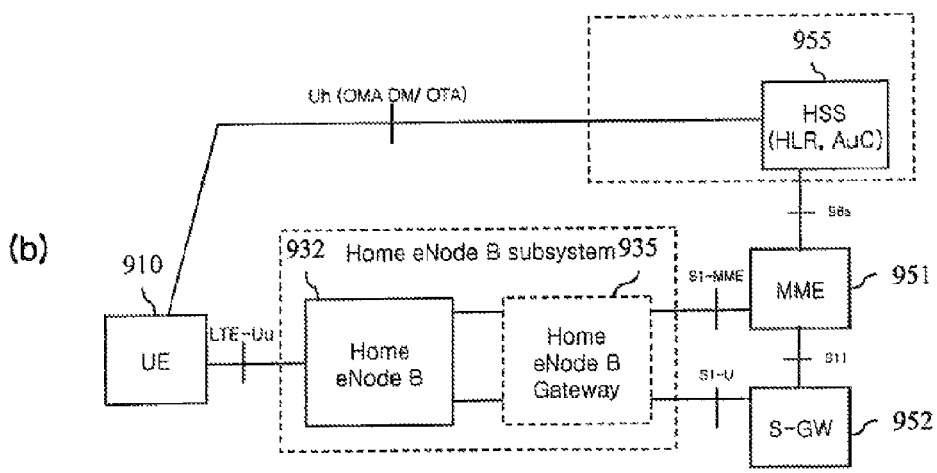
Figure 4:
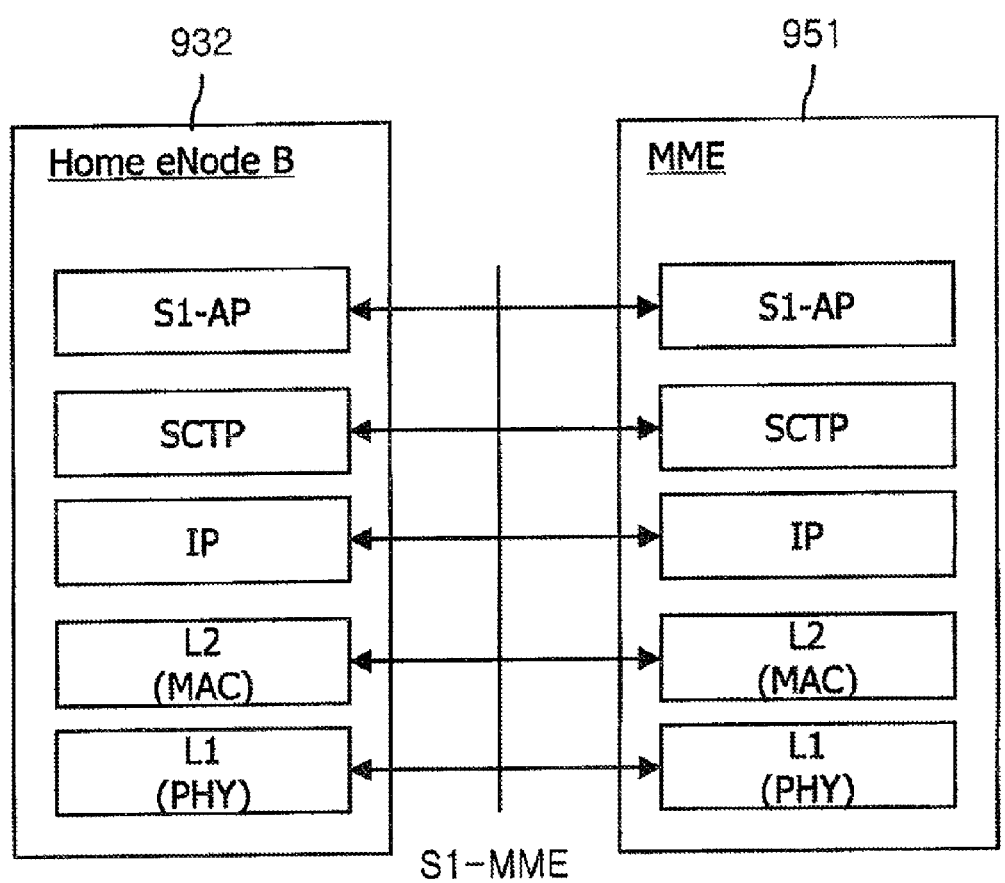
FIG. 4 is an exemplary diagram illustrating an interface between the Home eNodeB and an MME illustrated in FIG. 3.
Figure 5A:
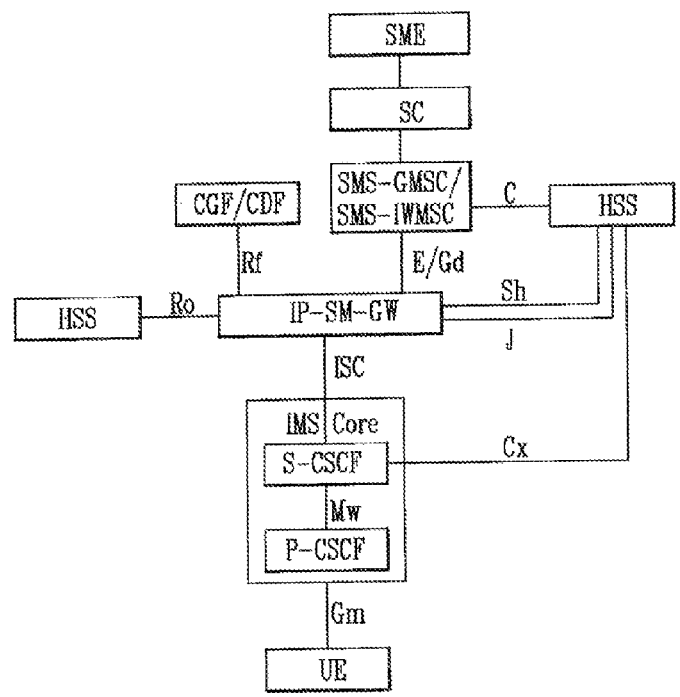
FIGS. 5a and 5b are general structural diagrams of an IP-connectivity access network (IP-CAN) that provides a short message.
Figure 5B:
Figure 5B:
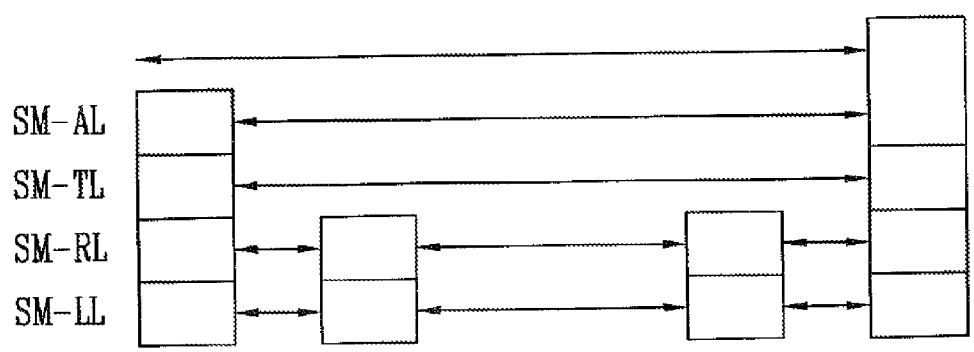

The present invention is described based on a universal mobile telecommunication system (UMTS) and an evolved packet core (EPC), but the present invention is not limited to the communication system, but may be applied to even all communication systems and methods to which the technical spirit of the present invention can be applied.

It is noted that Technical terms used in the specification are used to just describe a specific embodiment and do not intend to limit the present invention. Further, if the technical terms used in the specification are not particularly defined as other meanings in the specification, the technical terms should be appreciated as meanings generally appreciated by those skilled in the art and should not be appreciated as excessively comprehensive meanings or excessively reduced meanings. Further, when the technical term used in the specification is a wrong technical term that cannot accurately express the spirit of the present invention, the technical term is substituted by a technical term which can correctly appreciated by those skilled in the art to be appreciated. In addition, a general term used in the present invention should be analyzed as defined in a dictionary or according to front and back contexts and should not be analyzed as an excessively reduced meaning.

Moreover, if singular expression used in the specification is not apparently different on a context, the singular expression includes a plural expression. Further, in the present invention, it should not analyzed that a term such as "comprising" or "including" particularly includes various components or various steps disclosed in the specification and some component or some steps among them may not included or additional components or steps may be further included.

In addition, terms including ordinal numbers, such as 'first', 'second', etc. can be used to describe various components, but the components should not be limited by the terms. The above terminologies are used only to discriminate one component from the other component. For example, a first component may be named as a second component and similarly, the second component may also be named as the first component.

It should be understood that, when it is described that an element is "coupled" or "connected" to another element, the element may be "directly coupled" or "directly connected" to the another element or "coupled" or "connected" to the another element through a third element. In contrast, it should be understood that, when it is described that an element is "directly coupled" or "directly connected" to another element, it is understood that no element is not present between the element and the another element.

Hereinafter embodiments of the present invention will be described in detail with reference to the accompanying drawings, in which like or similar reference numerals refer to like elements regardless of reference numerals and a duplicated description thereof will be omitted. In describing the present invention, when it is determined that the detailed description of the known art related to the present invention may obscure the gist of the present invention, the detailed description thereof will be omitted. Further, it is noted that the accompanying drawings are used just for easily appreciating the spirit of the present invention and it should not be analyzed that the spirit of the present invention is limited by the accompanying drawings. It should be analyzed that the spirit of the present invention is extended up to all changes, equivalents, or substitutions in addition to the accompanying drawings.

Hereinafter, a terminology called a terminal is used, but the terminal may be called user equipment (UE), mobile equipment (ME), or a mobile station (MS). Further, the UE may be portable devices such as a cellular phone, a PDA, a smart phone, a notebook, and the like or Importable devices such as a PC, a vehicle mounted device, and like.

Definition of Terminologies

Hereinafter, terminologies used in the specification will be defined in brief in order to assist understanding the present invention before a description referring the accompanying drawings.

UMTS: Represents a $3^{rd}$ mobile communication network as an abbreviation of universal mobile telecommunication system.

EPS: represents a core network that supports a long term evolution (LTE) network as an abbreviation of evolved packet system. A network evolved from the UMTS.

UE (User Equipment): The UE may be mentioned as terminologies such as the terminal, the mobile equipment (ME), and the like. Further, the UE may be portable devices such as a notebook, a cellular phone, a PDA, a smart phone, a multimedia device, and the like or Importable devices such as a PC, a vehicle mounted device, and like.

IMS (IP Multimedia Subsystem): As a network technique which may perform PS Packet Switching based on an Internet Protocol (IP) up to not only a wired terminal but also a wireless terminal, it is provided to connect both wired/wireless terminals through an IP (All-IP).

The IMS-based network includes a home subscriber server (HSS) including a database storing subscriber information of a user, and other entities. Further, the IMS-based network includes a call session control function (CSCF) for processing a procedure for control signaling, registration, and session. The CSCF may include a P-CSCF (Proxy-CSCF), an S-CSCF (Serving-CSCF), and an I-CSCF (Interrogating-CSCF). The P-CSCF operates as a first access point for user equipment (UE) in the IMS-based network. In addition, the S-CSCF processes the session in the IMS-based network. That is, the S-SCSF, as an entity serving to route the signaling, routes the session the IMS-based network. In addition, the I-CSCF operates at an access point with another entity in the IMS-based network.

2) The IPS-based session is controlled by a session initial protocol (SIP) under the IMS. The SIP is a protocol for controlling the session, and the SIP means a signaling protocol indicating a procedure for distinguishing the terminals for communication from each other to find the position thereof, generating a multimedia session between the terminals, or deleting and modifying the generated session. The SIP may provide a service without subordinating to an SIP uniform resource identifier (URI) similar to an email address in order to distinguish the respective users.

MSISDN (Mobile Subscriber Integrated Services Digital Network Number): MSISDN is a number uniquely identifying a subscription (subscriber) in a GSM or a UMTS network. The detailed description refers to the standard document 3GPP TS 23.003, TS 22.101.

IP-SM-GW (IP-Short-Message-Gateway): Application server providing the protocol interworking for delivery of the short message between an IP-based terminal and a short message service-service centre (SMS-SC). The detailed description refers to the standard document 3GPP TS 23.204.

Application server (AS): Server providing various multimedia services.

Registration: Represents a process in which the terminal itself notifies information associated with a present location thereof to the home network, that is, a process of accessing the home network by transmitting the present location thereof and other information.

Instance-ID (Instance identifier): Represents an SIP access header parameter to uniquely identify an SIP UA that performs registration. When international mobile station equipment identities (IMEI) are used, instance-id needs a format of an IMEI URN. If the IMEI may not be used, the instance-id needs to take an expression format of a UUID as a URN defined in IETF RFC 4122. Refer to standard document 3GPP TS 23.003 for a detailed description thereof.

IMPU (IP Multimedia PUblic identity): An IMS user has one or more IMPUs (that is, public user identity) in order to communicate with other users. Further, a plurality of UEs may share one IMPU. The IMPU follows an SIP uniform resource identifier (URI) or Tel URI format.

SME (Short Message Entity): represents an entity capable of transmitting or receiving the short message, and refer to standard document 3GPP TS 23.040 for a detailed description thereof.

iFC (Initial Filter Criteria): Represents a filter criterion which is stored in the HSS as a part of a user profile and downloaded to the S-CSCF in user registration. Refer to standard document 3GPP TS 23.218 for a detailed description thereof.

Hereinafter, the present invention will be described in detail with reference to the accompanying drawings.

Figure 6:
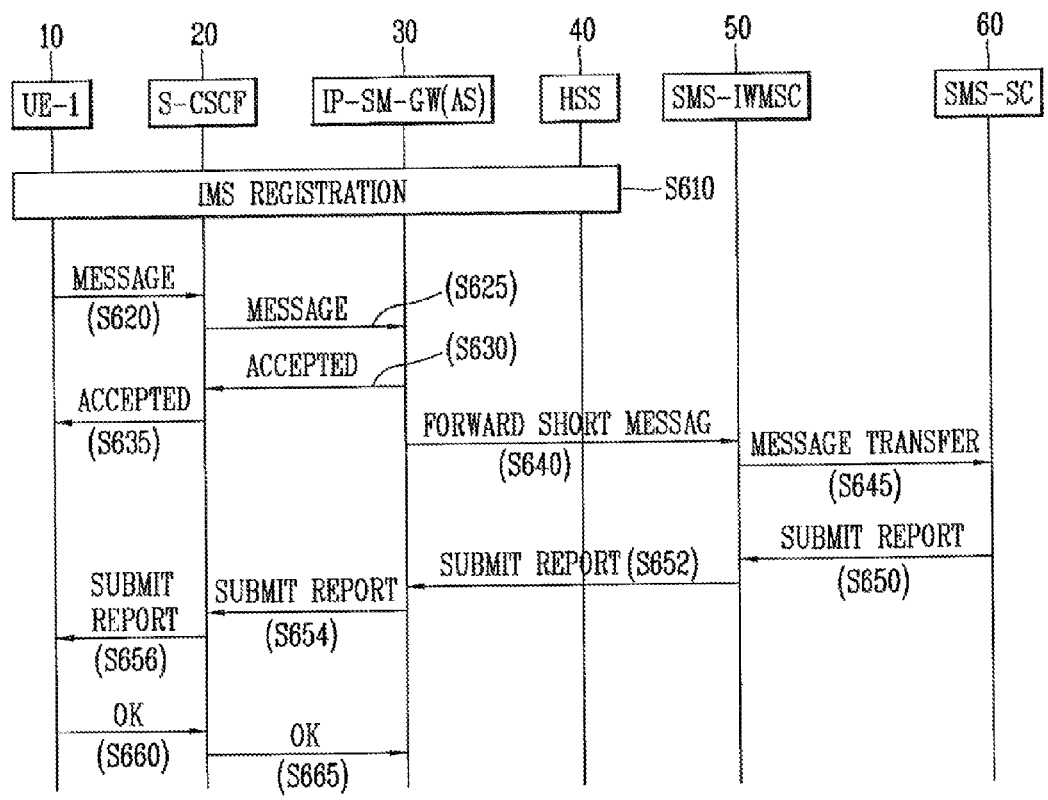
FIG. 6 is a flowchart illustrating a sending procedure of a short message in related art.

FIG. 6 is a flowchart illustrating a sending procedure of a short message in related art.

A terminal (hereinafter, referred to as UE-1) 10 performs registration in an IMS network (S610). Thereafter, the UE-1 10 transmits an SIP MESSAGE request message encapsulating a short message to an S-CSCF 20 (S620). In this case, a body of the SIP MESSAGE request message includes RP-DATA and the RP-DATA includes an SMS header and SMS user information encoded based on 3GPP TS 23.040.

An S-CSCF 20 forwards the SIP MESSAGE request message to an IP-SM-GW (AS) 30 based on a prestored iFC (S625).

The IP-SM-GW (AS) 30 sends an SIP 202 ACCEPTED message which is a response to the received SIP MESSAGE request message to the S-CSCF 20 (S630) and forwards the received SIP 202 ACCEPTED message to the UE-1 10 (S635).

The IP-SM-GW (AS) 30 performs a service authorization procedure based on stored subscriber information. That is, the IP-SM-GW (AS) 30 checks permitting the UE-1 10 that sends the SIP MESSAGE request message including the short message to use a short message service. When the service authorization is succeeded, the IP-SM-GW (AS) 30 extracts the short message encapsulated in the received SIP MESSAGE request message in step S625 and transmits the extracted short message to an SMS-IWMSC 50 (S640). In this case, the IP-SM-GW (AS) 30 transmits the extracted short message to the SMS-IWMSC 50 by using a MAP-MO-FORWARD-SHORT-MESSAGE.

The SMS-IWMSC 50 forwards the received short message to the SMS-SC 60 (S645).

The SMS-SC 60 transmits a Submit Report to the SMS-IWMSC 50 (S650) and the SMS-IWMSC 50 transmits the Submit Report to the IP-SM-GW (AS) 30 (S652).

The IP-SM-GW (AS) 30 transmits the SIP MESSAGE request message encapsulating the received Submit Report to the S-CSCF 20 (S654). The S-CSCF 20 sends the SIP MESSAGE request message including the Submit Report to the UE-1 10 (S656).

The UE-1 10 that receives the Submit Report sends an SIP 200 OK message which is a response thereto to the S-CSCF 20 (S660). The S-CSCF 20 forwards the received response message to the IP-SM-GW (AS) 30 (S665).

In the aforementioned short message transmitting procedure, an address of a receiver of the short message is included in an RP-User-Data of the RP-DATA. In detail, a TP destination address (TP-DA) field of a transfer protocol data unit (TPDU) configuring the RP-User-Data. In the short message transmitting procedure of FIG. 6, the IP-SM-GW (AS) 30 makes an address of a transmitter (that is, UE-1) of the short message be included in an RP-Originator Address (information element) IE of the RP-DATA. In this case, the address of the transmitter included is an MSISDN of the UE-1.

Figure 7:
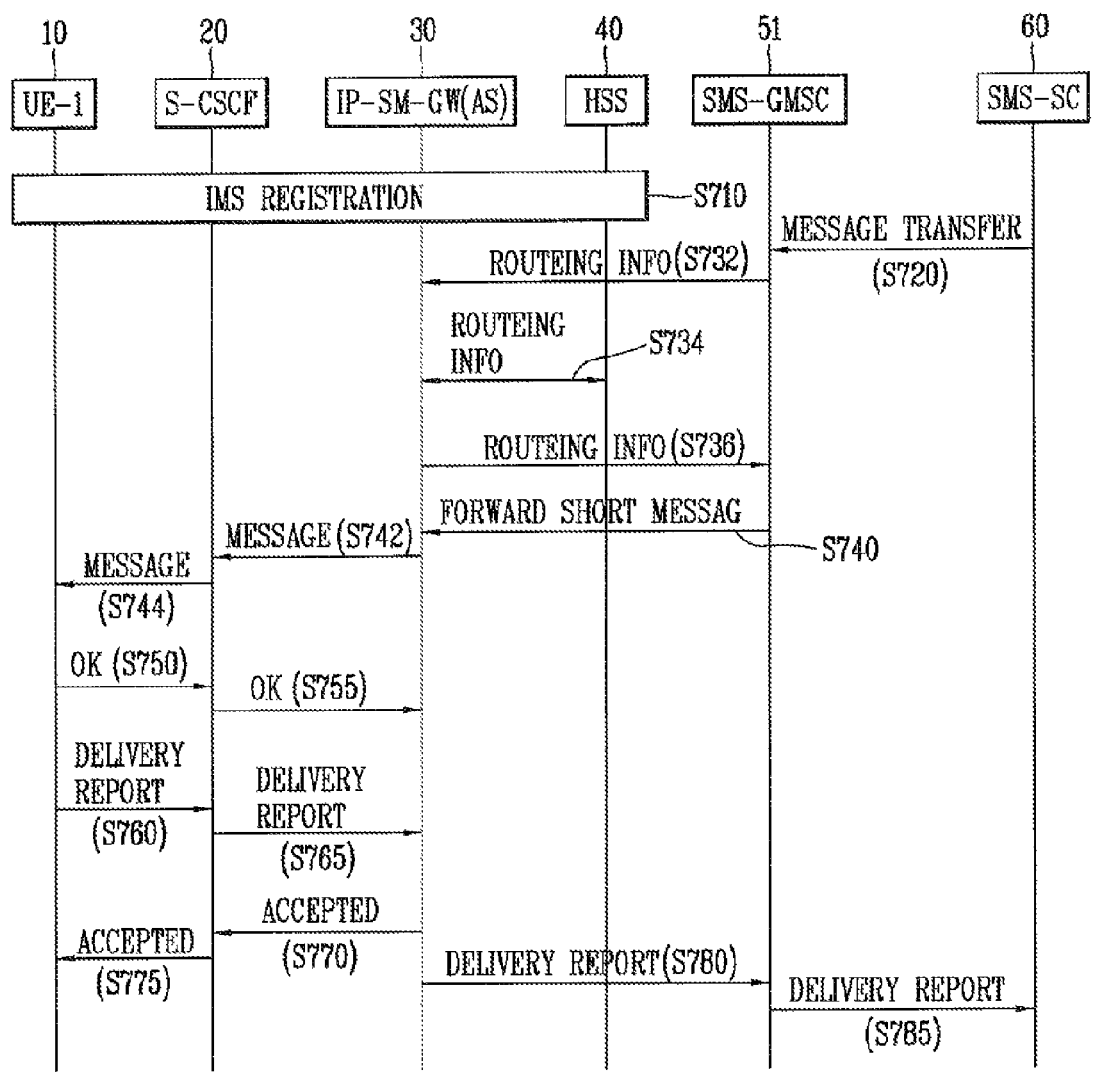
FIG. 7 is a flowchart illustrating a receiving procedure of the short message in related art.

FIG. 7 is a flowchart illustrating a receiving procedure of the short message in related art.

The UE-1 10 performs registration in an IMS network (S710). Thereafter, the SMS-SC 60 transmits the short message to an SMS-GMSC 51 (S720).

The SMS GMSC 51 that receives the short message transmits a Routing Info request message to an HSS 40 in order to retrieve routing information and the HSS 40 forwards to the IP-SM-GW (AS) 30 the Routing Info request message based on an address of a pre-configured IP-SW-GW of the UE-1 10 which is the receiver of the short message (S732). In detail, the SMS-GMSC 51 sends a MAP-SEND-ROUTING-INFO-FOR-SM message including the MSISDN of the UE-1 10 which is the receiver of the short message to the HSS 40 in order to retrieve the routing information to the receiver of the short message.

The HSS 40 transmits to the IP-SM-GW (AS) 30 an international mobile subscriber identity (IMSI) of the UE-1 10 which is the receiver of the short message (S734). The IP-SM-GW (AS) 30 generates an MT Correlation ID based on the IMSI value received from the HSS 40 in step S734 and stores the generated MT Correlation ID together with the IMSI value. A detailed matter associated with the generation of the MT Correlation ID refers to a standard document 3GPP TS 23.040. The IP-SM-GW (AS) 30 transmits to the SMS-GMSC 51 a Routing Info response message including the generated MT Correlation ID and an address value thereof (S736).

The SMS-GMSC 51 transmits to the IP-SM-GW (AS) 30 the short message including the MT Correlation ID received from the IP-SM-GW (AS) 30 in step S736 (S740). In this case, the SMS-GMSC 51 transmits the short message to the IP-SM-GW (AS) 30 by using a MAP-MT-FORWARD-SHORT-MESSAGE.

The IP-SM-GW (AS) 30 performs the service authorization based on the stored subscriber information. That is, the IP-SM-GW (AS) 30 checks permitting the UE-1 10 which is the receiver of the short message to use the short message service. When the service authorization is succeeded, the IP-SM-GW (AS) 30 transmits the SIP MESSAGE request message encapsulating the short message received in step S749 to the S-CSCF 20 (S742). In this case, a body of the SIP MESSAGE request message includes the RP-DATA and the RP-DATA includes an SMS header and SMS user information encoded based on 3GPP TS 23.040.

The S-CSCF 20 sends the received SIP MESSAGE request message to the UE-1 10 (S744).

The UE-1 10 that receives the short message transmits an SIP 200 OK message which is a response message to the S-CSCF 20 (S750) and the S-CSCF 20 forwards the SIP 200 OK message to the IP-SM-GW (AS) 30 (S755).

The UE-1 10 transmits a Delivery Report including a response (positive or negative) to the received short message to the S-CSCF 20 (S760) and the S-CSCF 20 forwards the Delivery Report to the IP-SM-GW (AS) 30 (S765).

The IP-SM-GW (AS) 30 sends an SIP 202 ACCEPTED message which is a response to the received Delivery Report to the S-CSCF 20 (S770) and forwards the received SIP 202 ACCEPTED message to the UE-1 10 (S775).

The IP-SM-GW (AS) 30 transmits the Delivery Report to the SMS-GMSC 51 (S780) and the SMS-GMSC 51 transmits the Delivery Report to the SMS-SC 60 (S785).

In the aforementioned short message receiving procedure, an address of a transmitter of the short message is encapsulated in the RP-User-Data of the RP-DATA. In detail, the address is encapsulated in a TP originating address (TP-OA) configuring the RP-User-Data. In the short message receiving procedure of FIG. 7, the IP-SM-GW (AS) 30 sets a Request-URI of the SIP MESSAGE request message as an IMPU of the UE-1 10 which is the receiver of the short message. In this case, the IP-SM-GW (AS) 30 may find the receiver of the short message based on an MT Correlation ID value generated by using the IMSI value of the UE-1 encapsulated in the received short message.

As illustrated in FIGS. 6 and 7, the IP-SM-GW needs to find MSISDN information of a terminal served thereby in order to perform protocol interworking for transmission and reception of the SMS of the IP based terminal, in the related art.

Figure 8:
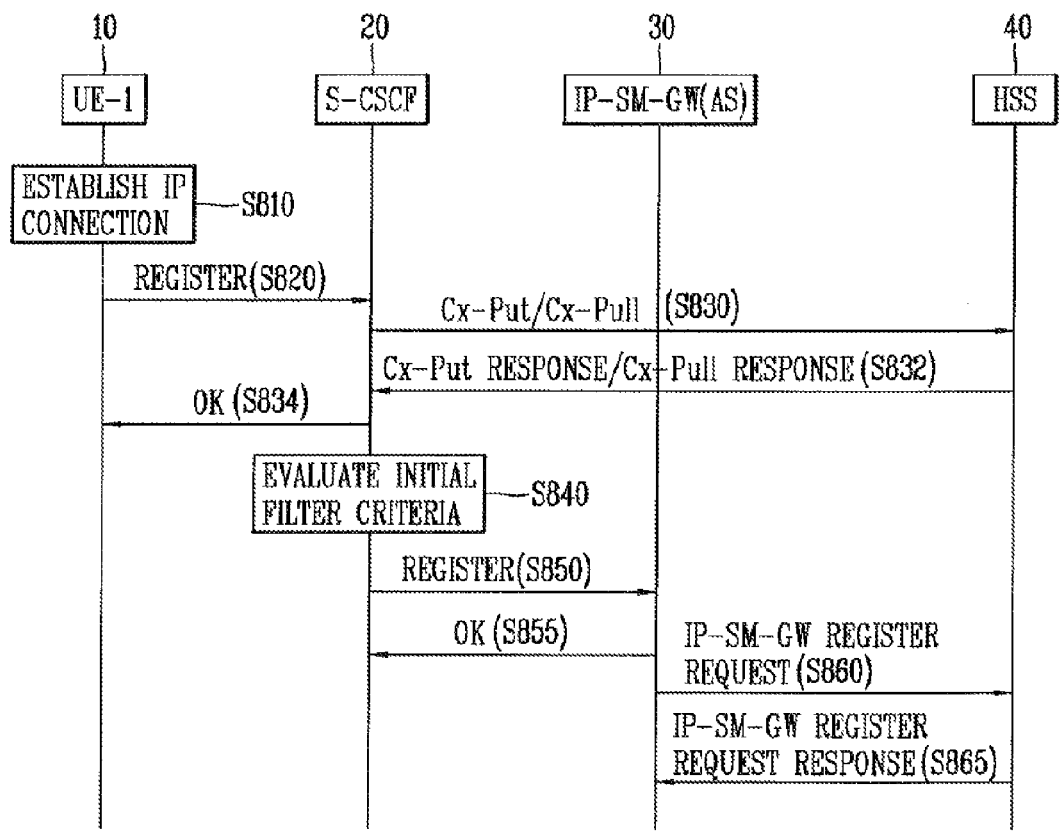
FIG. 8 is a flowchart illustrating an IMS registration procedure in related art.

FIG. 8 is a flowchart illustrating an IMS registration procedure in related art.

The IP-SM-GW acquires the MSISDN information of the terminal served thereby through the IMS registration procedure.

First, the UE-1 10 forms IP connection (S810). Thereafter, the UE-1 10 that forms the IP connection transmits an SIP REGISTER request message to the S-CSCF 20 in order to perform IMS registration (S820).

The S-CSCF 20 transmits a C-Put/Cx-Pull message to the HSS 40 (S830). The HSS 40 sends a Cx-Put Response/Cx-Pull Response message encapsulating the subscriber information of the UE-1 10 that performs the IMS registration. The S-CSCF 20 sends an SIP 200 OK message which is a response to an SIP REGISTER request message (S834).

The S-CSCF 20 analyzes initial filter criteria (iFC) configuring the subscriber information received from the HSS 40 in step 4 (S840). As a result, the S-CSCF 20 decides performing third-party registration in the IP-SM-GW (AS) 30 (S840).

The S-CSCF 20 transmits the SIP REGISTER request message to the IP-SM-GW (AS) 30 (S850). In this case, the S-CSCF 20 encapsulates the MSISDN of the UE-1 10 that performs the IMS registration in the SIP REGISTER request message, that is, a <service-info> XML element of a message body. The MSISDN information is encapsulated in the iFC configuring the subscriber information received from the HSS 40 in step S832. In detail, the MSISDN is encapsulated in service information of the iFC for the IP-SM-GW.

The IP-SM-GW (AS) 30 stores mapping of the IMPU and the MSISDN of the UE-1 10 that performs the IMS registration.

The IP-SM-GW (AS) 30 transmits the SIP 200 OK message which is the response to the received SIP REGISTER request message to the S-CSCF 20 (S855). The IP-SM-GW (AS) 30 transmits an IP-SM-GW Register Request message to the HSS 40 in order to notify that the UE-1 10 performing the IMS registration is available (that is, may receive the short message) (S860). In this case, the IP-SM-GW uses a MAP-ANY-TIME-MODIFICATION message and sets the MSISDN value received from the S-CSCF in step S850 as an identifier of a subscriber.

The HSS 40 transmits to the IP-SW-GW (AS) 30 an IP SM GW Register Response message which is a response message to the received IP-SM-GW Register Request message (S865).

As described in the operation of the related art, the IP-SM-GW that performs the protocol interworking requires the MSISDN information associated with the IMS subscriber information to which the terminal belongs in order for the IP based terminal to send and receive the SMS.

However, a user who subscribes in only a PS without the MSISDN has attracted public attention in recent years, and as a result, a method that allows the users to use the SMS is required. In particular, M2M (machine-to-machine) communication using the SMS has attracted public attention in association with the M2M communication using a mobile communication network in which a standardization operation has been promoted in 3GPP in recent years. Therefore, a case in which the short message is transmitted to various types of M2M terminals (for example, a PS dedicated M2M terminal, an M2M terminal in which both a circuit switched (CS) voice network and the PS are available, and the like) and the short message is received from various types of M2M terminals may be considered.

Figure 9:
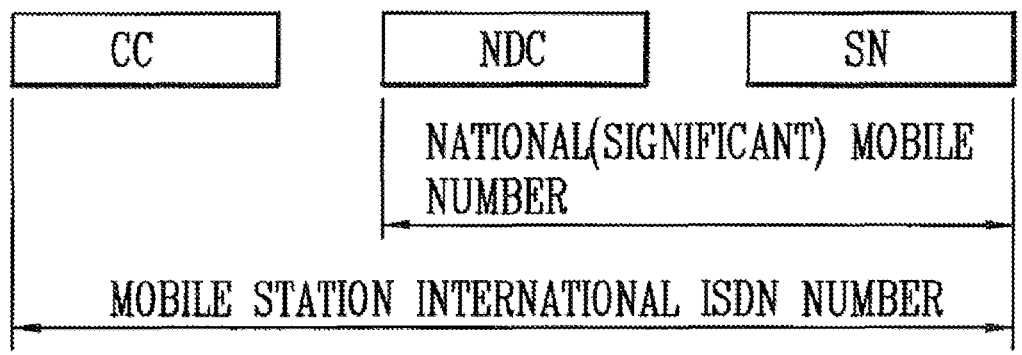
FIG. 9 is a structural diagram of a mobile subscriber integrated services digital network (MSISDM).

FIG. 9 is a structural diagram of a mobile subscriber integrated services digital network number (MSISDM).

Referring to 3GPP TS 23.003, a constitution of the MSISDN in the related art is the same as that of FIG. 8.

A country code (CC) field represents a country code of a country where the terminal is registered (that is, subscribed). A national (significant) mobile number is constituted by NDC and SN fields. In this case, NDC is an abbreviation of National Destination Code and SN is an abbreviation of Subscriber Number.

In the embodiment of the specification, when a terminal (alternatively, an MSISDN-less UE) that does not a mobile communication global unique number (for example, MSISDN) associated with the subscriber information performs the IMS registration, a related entity allocates a temporary identifier (SMS identifier (ID)) to used for the SMS during an IMS registration valid period of the terminal. The related entity may be a gateway (for example, IP-SM-GW) that interworks messages of heterogeneous protocols for a sending terminal, a home subscriber server (HSS), or an IMS based session controller (for example, S-CSCF) or other network entities.

The gateway may generate the temporary identifier by using one of methods described below.

(1) Generating temporary identifier in format such as MSISDN

The gateway may use a prestored (preconfigured) in the gateway as the country code (CC) and national destination code (NDC) values or the CC and NDC values in the subscriber information acquired from the HSS, at the time of generating the SMS-ID. Herein, the CC and NDC values may be allocated in the same method as a general MSISDN. As a result, even though the SMS-ID is used, a signal and/or a message toward the UE may be routed similarly as the case in which the MSISDN is used and a home network in which the UE subscribes may be found.

The subscriber number (SN) needs to be generated for the MSISDN-less UE that performs the IMS registration and the value needs to be unique in the IMS network. (As a result, the generated SMS-ID is globally unique.) A plurality of gateways may be present in one IMS network. Accordingly, the NDC value may be differently for each gateway in order to avoid a case in which the SMS-ID values generated in different gateways are the same as each other (that is, so that the SMS-ID is unique in one IMS network) or the gateway may put a unique number (if 1 for IP-SM-GW-1 and 2 for IP-SM-GW-2) allocated thereto in a head part of the SN at the time of generating the SN. Alternatively, a range of the SN which each gateway may allocate to the UE is set to prevent the SNs allocated in the respective gateways to duplicate with each other (for example, by a method such as 0~xxxxx for the IP-SM-GW-1 and xxxxx+1~yyyyy for the IP-SM-GW-2).

The SN may be i) generated randomly, ii) generated sequentially, iii) generated by using an Instance-ID transmitted when the UE performs the IMS registration, or iv) generated by using a value encapsulated in the subscriber information of the UE. Besides, various methods may be used.

In the above description, the CC and NDC values are allocated in the same method as in the general MSISDN, and as a result, UEs that belong to different providers may switch the short message. However, when switch of the short message between UEs that belong to the same provider is considered, the CC and NDC values may be arbitrarily allocated. Further, even though the CC and NDC values are allocated in not the same method as but different from the general MSISDN (if a rule for the generation of the SMS-ID is defined differently among providers in order to provide an SMS service in which the MSISDN-less UE intervenes, and the like), the short message may be forwarded.

(2) Generating SMS-ID having new value regardless of format of MSISDN (3) The SMS-ID may be set by using the existing identifier (for example, IMSI, integrated circuit card ID (ICCID), and the like) instead of generating the new value for the SMS-ID. In this case, all of the existing identifiers may be set as the SMS-ID or the SMS-ID may be set by using only some values thereamong.

Even in the allocation method of (2) or (3), the SMS-ID is allocated to be unique in the IMS network as described in the allocation method of (1). Further, in this case, the SMS-ID for only switching the short message between the UEs that belong to the same provider or the SMS-ID may be allocated so as to switch the short message between UEs that belong to different providers.

The SMS-ID generated for the MSISDN-less UE that performs the IMS registration is released from the gateway when the UE is de-registered.

Figure 10:
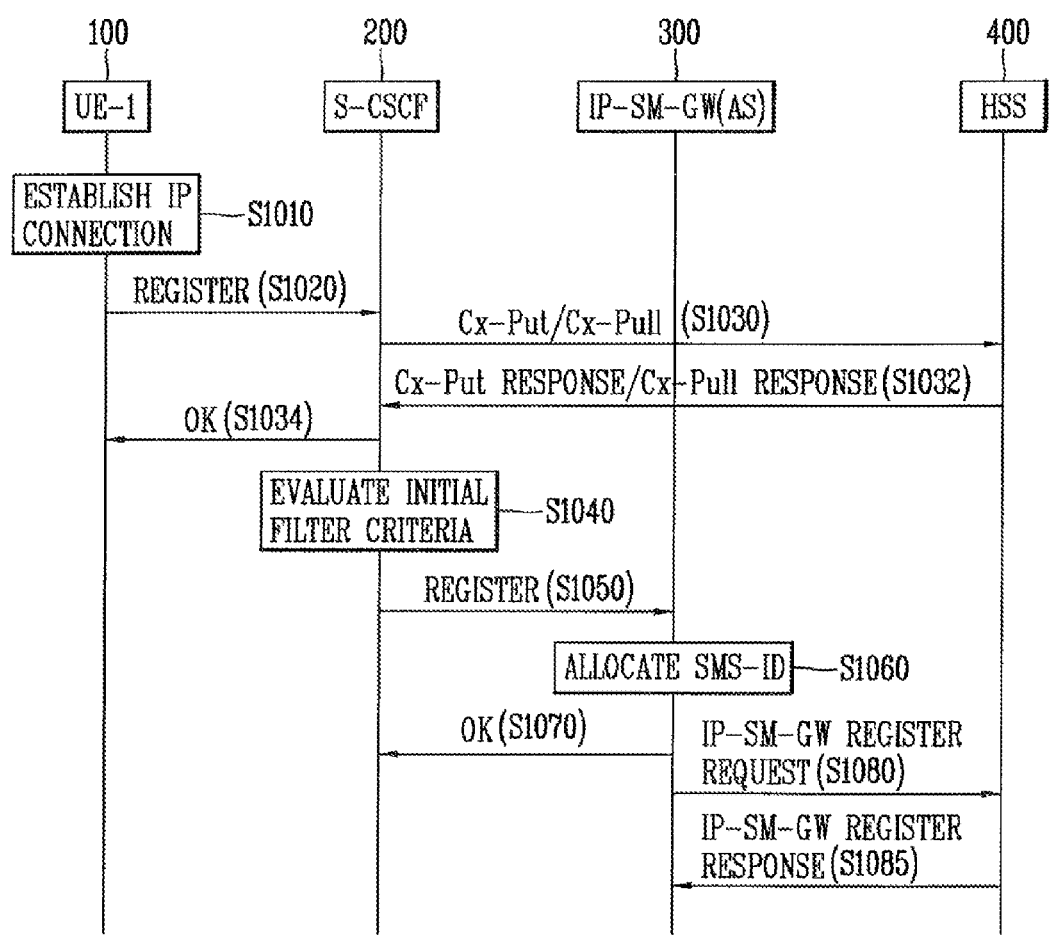
FIG. 10 is a first embodiment of a process of allocating a temporary identifier according to the specification.

FIG. 10 is a first embodiment of a process of allocating a temporary identifier according to the specification.

In the embodiment, the gateway (for example, IP-SM-GW) that interworks the messages of the heterogeneous protocols for the sending terminal allocates the temporary identifier. The temporary identifier is an identifier used for the SMS during the IMS registration valid period of the IMS subscribing terminal without the mobile communication global unique number (for example, MSISDN). The temporary identifier may be the SMS-ID. Hereinafter, the gateway that interworks the messages of the heterogeneous protocols for the sending terminal is also called the IP-SM-GW.

First, the UE-1 100 forms the IP connection (S1010). The UE-1 100 that forms the IP connection transmits a registration request message (for example, SIP based register request message) to an IMS based session controller in order to perform the IMS registration (S1020). In this case, the session controller may be an S-CSCF 200 (hereinafter, the session controller is also called the S-CSCF).

The session controller 200 transmits a message (for example, Cx-Put/Cx-Pull message) to request the information on the UE-1 100 to a home subscriber server (S1030). In this case, the home subscriber server may be an HSS 400 (hereinafter, the home subscriber server is also referred to as the HSS).

The HSS 400 sends a response message (for example, the Cx-Put Response/Cx-Pull Response message) encapsulating the subscriber information of the UE-1 100 that performs the IMS registration.

The session controller 200 sends the response message (for example, the SIP based 200 OK message) to the registration request message to the UE-1 100 (S1034).

The S-CSCF 200 analyzes initial filter criteria (iFC) configuring the subscriber information received from the HSS 400 in step 1032 (S1040). As a result, the session controller 200 decides performing $3^{rd}$-party registration in the gateway 300.

The session controller 200 transmits the registration request message (for example, the SIP based REGISTER request message) to the gateway 300 (S1050). In this case, since the subscriber information which the session controller 200 receives from the HSS 400 in step S1032 does not include the mobile communication global unique number information of the UE-1 100, the session controller 200 does not encapsulate the mobile communication global unique number information in the registration request message. In this case, the session controller 200 may explicitly notify that the registration request message does not encapsulate the mobile communication global unique number information. (it is specified that there is no mobile communication global unique number information or allocation of the temporary identifier is requested)

Therefore, the gateway 300 that receives the registration request message allocates the temporary identifier (for example, the SMS-ID) for the UE-1 100 according to the method described in FIG. 9 (S1060).

Thereafter, the gateway 300 transmits the response message (for example, SIP 200 OK message) to the registration request message to the session controller 200 (S1070).

Further, the gateway 300 transmits the registration request message (for example, IP-SM-GW Register Request message) to the HSS 400 in order to notify that the UE-1 100 performing the IMS registration may receive the short message (S1080). In this case, the gateway 300 may transmit the temporary identifier of the UE-1 100 by using the MAP-ANY-TIME-MODIFICATION message.

The HSS 400 stores the temporary identifier encapsulated in the received registration request message and transmits the response message (for example, IP SM GW Register Response message) to the request message to the gateway 300 (S1085).

Figure 11:
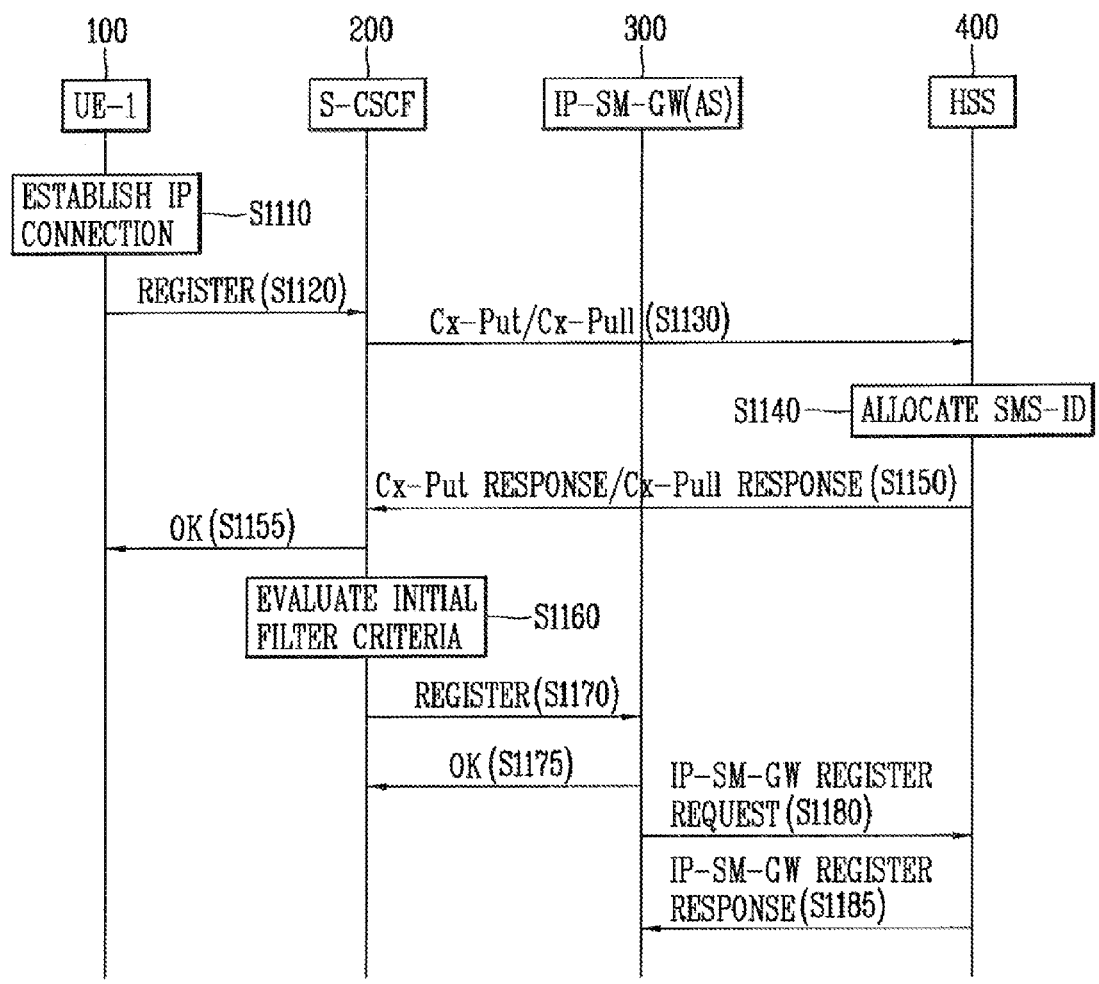
FIG. 11 is a second embodiment of a process of allocating a temporary identifier according to the specification.

FIG. 11 is a second embodiment of a process of allocating a temporary identifier according to the specification.

Unlike FIG. 10, the home subscriber server (for example, HSS) may allocate the temporary identifier for the IMS subscribing terminal without the mobile communication global unique number. The temporary identifier is the identifier used for the SMS during the IMS registration valid period of the terminal. The temporary identifier may be the SMS-ID.

The HSS 400 encapsulates the generated temporary identifier in the iFC for the gateway (for example, IP-SM-GW) that interworks the messages of the heterogeneous protocols to allow the IMS based session controller that performs the $3^{rd}$-party registration in the gateway to acquire the temporary identifier.

Steps S1110 to S1130 are the same as steps S1010 to S1030 of FIG. 10.

Thereafter, the HSS 400 verifies that there is no mobile communication global unique number of the UE-1 100 through the subscriber information and allocates the temporary identifier (for example, SMS-ID) for the UE-1 100 according to the method described in FIG. 9 (S1060). The HSS 400 may store the allocated temporary identifier information is connection with the IMPU of the UE-1 100.

The Cx-Put/Cx-Pull message received by the HSS in step S1130 may explicitly encapsulate an indication to request the HSS to allocate the temporary identifier. The indication may be added by the session controller or may be encapsulated when the terminal sends the SIP REGISTER request message to the session controller.

The HSS 400 encapsulates the allocated temporary identifier in the service information of the iFC for the gateway. Thereafter, the HSS 400 sends to the session controller 200 the response message (for example, the Cx-Put Response/Cx-Pull Response message) encapsulating the subscriber information of the UE-1 100 that performs the IMS registration (S1150).

The session controller 200 sends the response message (for example, the SIP based 200 OK message) to the registration request message to the UE-1 100 (S155).

The session controller 200 analyzes the initial filter criteria (iFC) configuring the subscriber information received from the HSS 400 in step 1032 (S1060). As a result, the session controller 200 decides performing the $3^{rd}$-party registration in the gateway 300.

The session controller 200 transmits the registration request message (for example, the SIP based REGISTER request message) to the IP-SM-GW 300 (S1170). In this case, the session controller 200 encapsulates the temporary identifier information of the UE-1 100 in the registration request message (for example, <service-info> XML element of the message body). The temporary identifier information may be encapsulated in the iFC. The gateway 300 stores mapping of the IMPU of the UE-1 100 and the temporary identifier.

Thereafter, the gateway 300 transmits the response message (for example, SIP 200 OK message) to the registration request message to the session controller 200 (S1175).

Further, the gateway 300 transmits the registration request message (for example, IP-SM-GW Register Request message) to the HSS 400 in order to notify that the UE-1 100 performing the IMS registration may receive the short message (S1180). In this case, the gateway 300 may transmit the temporary identifier of the UE-1 100 by using the MAP-ANY-TIME-MODIFICATION message.

The HSS 400 transmits the response message (for example, IP SM GW Register Response message) to the received registration request message to the gateway 300 (S1185).

In FIG. 11, the HSS allocates the temporary identifier before transmitting the subscriber information to the session controller, but contrary to this, the temporary identifier is generated when the subscriber subscribes in the service to be stored in the iFC for the gateway. In this case, the temporary identifier is used during the IMS registration valid period of the terminal, but may be permanently used during a period when the subscriber subscribes in the service.

Figure 12:
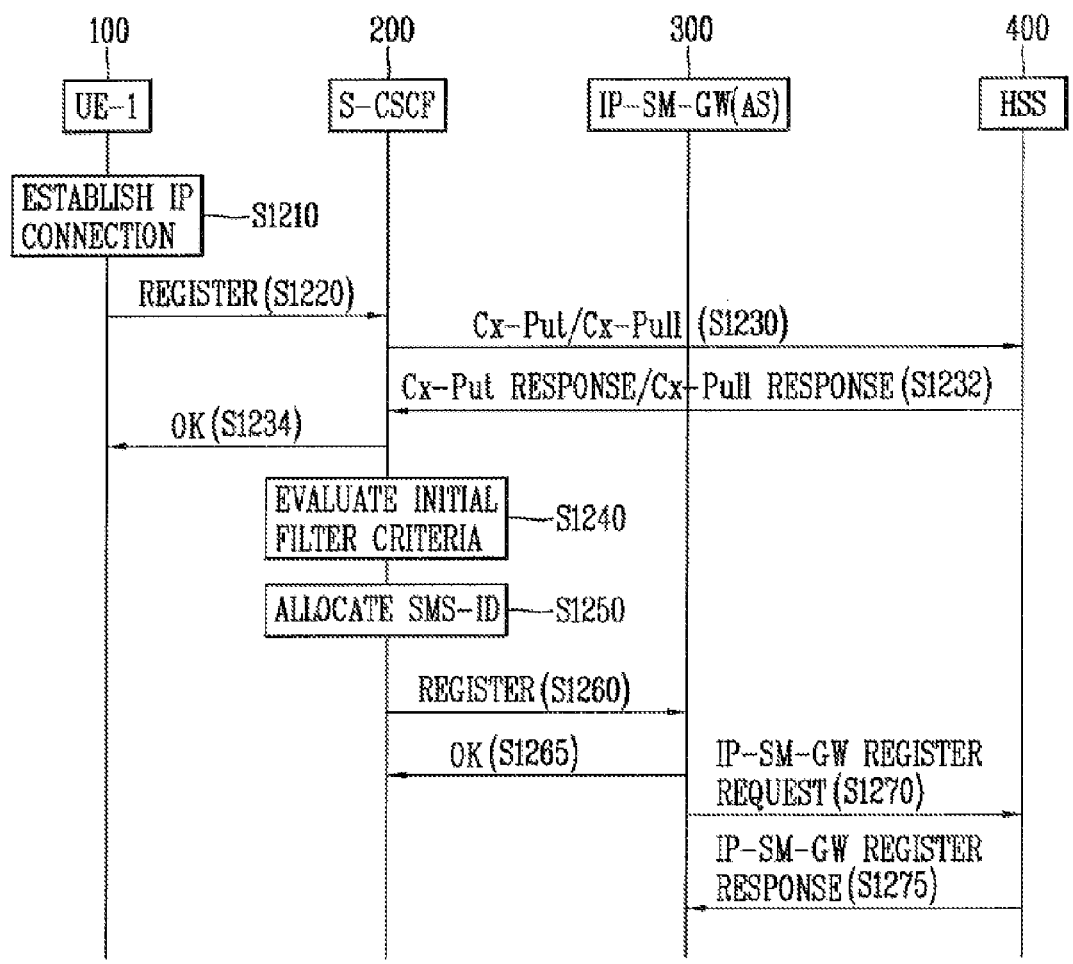
FIG. 12 is a third embodiment of a process of allocating a temporary identifier according to the specification.

FIG. 12 is a third embodiment of a process of allocating a temporary identifier according to the specification.

Unlike FIG. 10 or FIG. 11, the IMS based session controller (for example, S-CSCF) may allocate the temporary identifier for the IMS subscribing terminal without the mobile communication global unique number. The temporary identifier is the identifier used for the SMS during the IMS registration valid period of the terminal. The temporary identifier may be the SMS-ID.

The session controller may provide the generated temporary identifier to the gateway (for example, IP-SM-GW) that interworks the messages of the heterogeneous protocols in the $3^{rd}$-party registration.

Steps S1210 to S1234 are the same as steps S1010 to S1034 of FIG. 10.

Thereafter, the session controller 200 analyzes the iFC received from the HSS 400 in step S1232 (S1240). As a result, the session controller 200 decides performing the $3^{rd}$-party registration in the gateway 300.

In this case, since the iFC does not encapsulate the mobile communication global unique number information for the UE-1 that performs the IMS registration, the session controller 200 decides allocating the temporary identifier. Alternatively, the UE-1 100 may explicitly request to the session controller allocating the temporary identifier therefor at the time of sending the SIP REGISTER request message for the IMS registration.

The session controller 200 allocates the temporary identifier (for example, SMS-ID) for the UE-1 100 according to the method described in FIG. 9 (S1250).

The session controller 200 transmits the registration request message (for example, the SIP based REGISTER request message) to the gateway 300 (S1260). In this case, the session controller 200 encapsulates the temporary identifier information of the UE-1 100 in the registration request message (for example, <service-info> XML element of the message body). The temporary identifier information may be encapsulated in the iFC. The gateway 300 stores mapping of the IMPU of the UE-1 100 and the temporary identifier. Additionally, the session controller 200 may encapsulate a parameter to specify the temporary identifier value notified to the IP-SM-GW is an ID allocated for the SMS, in the SIP REGISTER request message.

Thereafter, the gateway 300 transmits the response message (for example, SIP 200 OK message) to the registration request message to the session controller 200 (S1265).

Further, the IP-SM-GW 300 transmits the registration request message (for example, IP-SM-GW Register Request message) to the HSS 400 in order to notify that the UE-1 100 performing the IMS registration may receive the short message (S1270). In this case, the gateway 300 may transmit the temporary identifier of the UE-1 100 by using the MAP-ANY-TIME-MODIFICATION message.

The HSS 400 stores the temporary identifier value encapsulated in the received registration request message and transmits the response message (for example, IP SM GW Register Response message) to the request message to the gateway 300 (S1275).

Table 1 illustrates a constitution of the aforementioned MAP-ANY-TIME-MODIFICATION message.

TABLE 1

| Parameter name | Request | Indication | Response | Confirm |
|---|---|---|---|---|
| Invoke id | M | M(=) | M(=) | M(=) |
| gsmSCF-Address | M | M(=) | | |
| Subscriber Identity | M | M(=) | | |
| Modification request for ODB data | C | C(=) | | |
| Modification request for SS information | C | C(=) | | |
| Modification request for CSI | C | C(=) | | |
| Modification request for CSG | C | C(=) | | |
| Long FTN Supported | C | C(=) | | |
| Modification request for IP-SM-GW data | C | C(=) | | |
| Activation request for UE-Reachability | C | C(=) | | |
| Ext Forwarding information-for-CSE | | | C | C(=) |
| Ext Call barring information-for-CSE | | | C | C(=) |
| ODB Info | | | C | C(=) |
| CAMEL subscription info | | | C | C(=) |
| User error | | | C | C(=) |
| Provider error | | | | O |

In step S1080 of FIG. 10 and step S1270 of FIG. 12, when the gateway sends the MAP-ANY-TIME-MODIFICATION message to the HSS, the ID information of the UE needs to be also encapsulated in addition to the temporary identifier. To this end, a method described below may be used.

1) The gateway sets the IMSI value of the UE in Subscriber Identity among parameters of the MAP-ANY-TIME-MODIFICATION of Table 1 and sets the temporary identifier value in a newly defined parameter. The gateway may be acquired the IMSI value of the UE from the UE or another network node.

2) The gateway sets the temporary identifier value of the UE in Subscriber Identity among the parameters of the MAP-ANY-TIME-MODIFICATION of Table 1 and sets the ID value of the UE in type newly defined parameter. In this case, as the ID value of the UE, even any information to recognize that the HSS is a specific UE (alternatively, subscriber), such as the IMSI, the IMPU, or the like may be used without limit.

Further, the gateway may add a parameter to specify that the temporary identifier value sent to the HSS is the ID allocated for the SMS to the MAP-ANY-TIME-MODIFICATION request message, in 1) and 2).

Figure 13A:
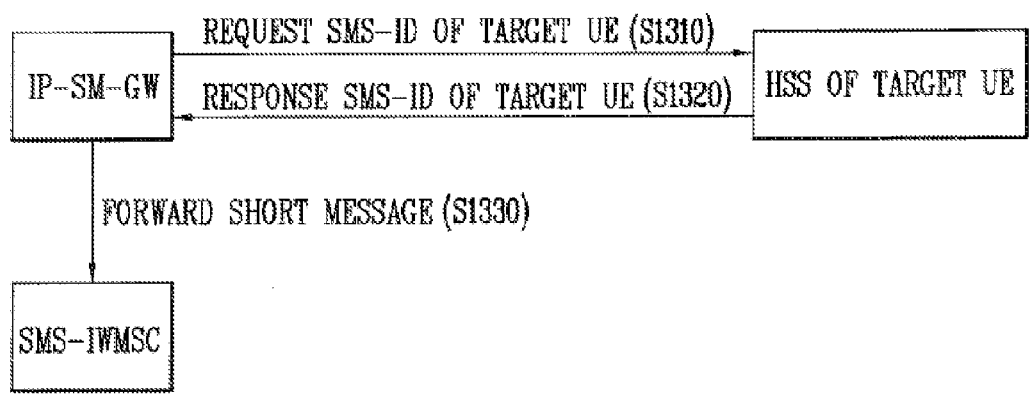
FIGS. 13a and 13b are diagrams illustrating a process of acquiring a temporary identifier of a short message receiving terminal.
Figure 13B:
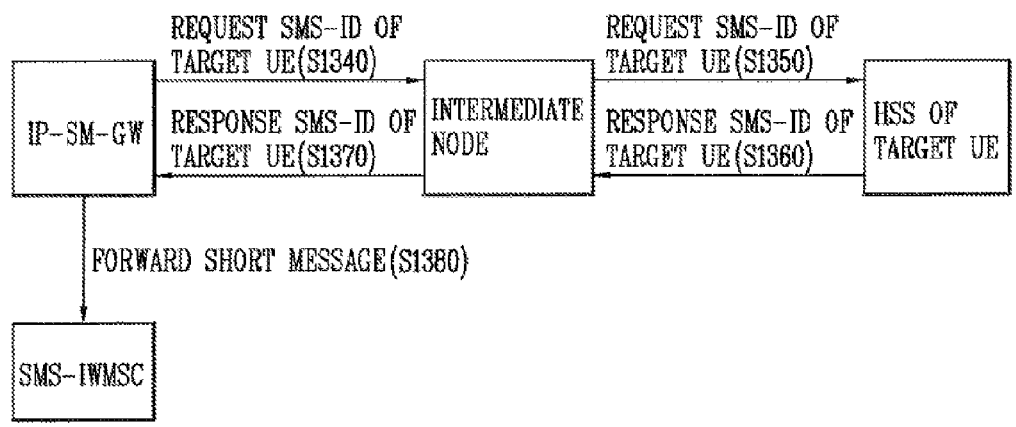

FIGS. 13a and 13b are diagrams illustrating a process of acquiring a temporary identifier of a short message receiving terminal.

As described in FIGS. 6 and 7, each of the address of the short message transmitter and the address of the short message receiver are the MSISDN of each of the transmitter and the receiver, and are forward with being encapsulated in the RP-DATA.

However, both a sending terminal (or a source terminal) and a receiving terminal (or a target terminal) of the short message are IMS subscribing terminals without mobile communication global unique numbers, a network entity serving as the sending terminal for transferring the short message or the sending terminal needs to know a temporary identifier (for example, SMS-ID) value of the receiving terminal. The temporary identifier of the receiving terminal is required when a TP-DA field configuring a SMS-SUBMIT-type TPDU as an example is set. A method of obtaining the temporary identifier value allocated to the receiving terminal of the short message is as follows. (1) Method of acquiring a temporary identifier value from a home subscriber server (for example, HSS) of the receiving terminal by the gateway (for example, IP-SM-GW) serving as the sending terminal Since the short message sending terminal does not know mobile communication global unique number information for the receiving terminal, the sending terminal includes an SIP URI which is an IMPU of the receiving terminal in a SIP-based message (for example, SIP MESSAGE request) without setting the TP-DA field of the TPDU.

When the gateway receives the short message, the gateway acquires the temporary identifier (for example, SMS-ID) value allocated to the receiving terminal form the home subscriber server as illustrated in FIG. 13A (S1310 and S1320), and then forwards the short message to a switcher (for example, SMS-IWMSC) by setting the value in the TP-DA field (S1330).

In step S1320 of FIG. 13A, the gateway may receive not only the SMS-ID information of the receiving terminal but also information on availability (that is, IMS registration) of the receiving terminal.

When the home subscriber server of the receiving terminal does not have the SMS-ID value allocated to the receiving terminal, the home subscriber server of the receiving terminal transmits a response informing that the temporary identifier value is not allocated. In this case, the gateway may transmit a transmission fail message informing that the short message may not be transmitted to the sending terminal, instead of forwarding the short message to the switcher.

Further, the gateway stores the short message, and then subscribes to a notification service notify the temporary identifier information for the receiving terminal. Thereafter, when the gateway knows the SMS-ID information of the receiving terminal, the stored short message may also be transmitted to the receiving terminal. To this end, the network needs to operate an entity or a functionality supporting the notification service, and the entity or the functionality may be added/extended to an existing entity or service and may also newly operate.

In FIG. 13A, the exemplary embodiment in which the gateway directly transmits and receives the message with the home subscriber server to which the receiving terminal belongs is described, but like FIG. 13B, the gateway may also acquire the temporary identifier information for the receiving terminal through an intermediate node (S1340 to S1380). The intermediate node may have a form adding the aforementioned function to the existing node, and may be a node newly defined for the present invention. Further, when the sending terminal and the receiving terminal belong to different providers, the gateway may also acquire the temporary identifier information allocated to the receiving terminal through an intermediate node (for example, S-intermediate node) in the home network to which the sending terminal belongs and an intermediate node (for example, T-intermediate node) in the home network to which the receiving terminal belongs.

In this case, the gateway may also acquire the temporary identifier information allocated to the receiving terminal through another node between the S-intermediate node and the T-intermediate node. Of course, even though the sending terminal and the receiving terminal belong to different providers, the intermediate node in the home network to which the sending terminal belongs does not pass through the intermediate node in the home network to which the receiving terminal belongs to acquire the temporary identifier information from the home subscriber server to which the receiving terminal belongs.

(2) Method of acquiring a temporary identifier value from a home subscriber server (for example, HSS) of the receiving terminal by an IMS-based session controller (for example, S-CSCF) serving as the sending terminal Since the short message sending terminal does not know mobile communication global unique number information for the receiving terminal, the sending terminal includes an SIP URI which is an IMPU of the receiving terminal in a SIP-based message (for example, SIP MESSAGE request) without setting the TP-DA field of the TPDU.

When the session controller receives the short message, the session controller acquires the temporary identifier (for example, SMS-ID) value allocated to the receiving terminal from the home subscriber server to which the receiving terminal belongs, and then forwards the short message to the gateway (for example, IP-SM-GW) by setting the value in the TP-DA field.

This method is a method of replacing the gateway with the IMS-based session controller in the method described in the (1). Accordingly, the detailed description follows the description of the (1).

(3) Method of acquiring the temporary identifier (for example, SMS-ID) value allocated to the receiving terminal by subscribing to a notification service notifying the temporary identifier information for the receiving terminal by the sending terminal For the method, the network needs to operate an entity or a functionality supporting the notification service, and the entity or the functionality may be added/extended to an existing entity or service and may also newly operate.

(4) Method of directly requesting and acquiring the temporary identifier (for example, SMS-ID) information to the receiving terminal by the sending terminal In this case, the temporary identifier information allocated to the IMS subscribing terminal without the mobile communication global unique number needs to be notified to the terminal in advance. As an example of the method, the sending terminal may request the temporary identifier information to the receiving terminal by using an SIP OPTIONS message.

In the (1) and (2), the network entity serving as the sending terminal acquires the temporary identifier allocated to the receiving terminal, but unlike this, the sending terminal may also directly acquire the information from the home subscriber server of the receiving terminal. In this case, the methods described in the (1) and (2) may be applied.

Figure 14:
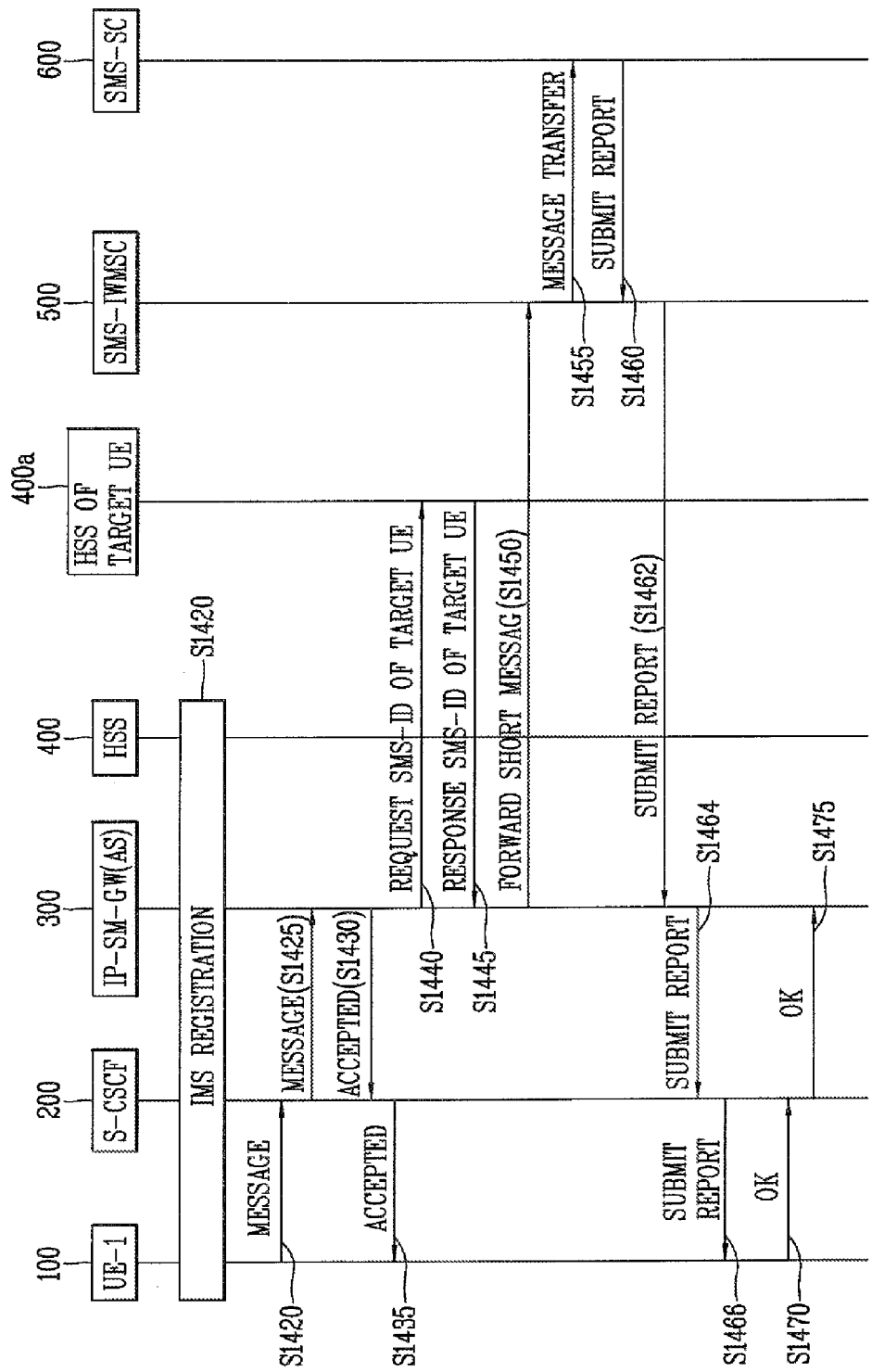
FIG. 14 is one embodiment of a process of transmitting a short message according the specification.

FIG. 14 is one embodiment of a process of transmitting a short message according the specification.

In the embodiment, it is assumed to use "(1) the method of acquiring a temporary identifier value from a home subscriber server (for example, HSS) of the receiving terminal by the gateway (for example, IP-SM-GW) serving as the sending terminal" among the methods of acquiring the temporary identifier value of the short message receiving terminal.

The UE-1 100 is the IMS subscribing terminal without the mobile communication global unique number.

The UE-1 100 performs registration in the IMS network according to the IMS registration procedure of FIGS. 10 to 12. In this case, the UE-1 100 receives the temporary identifier. The temporary identifier is an identifier used for the SMS during the IMS registration valid period of the IMS subscribing terminal without the mobile communication global unique number. The temporary identifier may be the SMS-ID.

The UE-1 100 encapsulates the short message in the SIP-based message (for example, SIP MESSAGE request message) in order to transmit the short message to transmit the encapsulated short message to the IMS-based session controller (for example, S-CSCF 200) (S1420). As an example, a body of the SIP MESSAGE request message includes an RP-DATA, and the RP-DATA may include an SMS header encoded based on 3GPP TS 23.040 and SMS user information.

In this case, since the UE-1 100 does not have the mobile communication global unique number information for the short message receiving terminal, the UE-1 100 may transmit the SIP URI which is the IMPU of the receiving terminal included in the SIP MESSAGE request message without setting the TP-DA field of the TPDU. In this case, the SIP URI information of the receiving terminal may be included by using one or more parameters among a header field of the SIP, a body parameter of the header field of the SIP, a tag of the header field of the SIP, a field of the SDP, and an extensible markup language (XML) body.

The session controller 200 transmits the received SIP-based message to the gateway 300 based on the stored iFC (S1425). In this case, the session controller 200 may selectively include the temporary identifier (for example, SMS-ID) of the sending terminal in the transmitted SIP based message (for example, P-Asserted-Identity header). In this case, the session controller 200 may also add a parameter indicating that the included temporary identifier value is the ID generated for the SMS.

Thereafter, the gateway 300 transmits the response message (for example, SIP 202 Accepted message) to the received SIP MESSAGE request message to the session controller 200 (S1430). The session controller 200 transmits the received response message to the UE-1 100 (S1435).

The gateway 300 performs service authorization based on the stored subscriber information. That is, the gateway 300 checks permitting the UE-1 100 that sends the SIP based message including the short message to use a short message service. When the service authorization is succeeded, the gateway 300 transmits an information request message to the home subscriber server (for example, HSS 400*a*) of the receiving terminal in order to acquire the temporary identifier (for example, SMS-ID) information of the short message receiving terminal (S1440).

The HSS 400 of the receiving terminal transmits the response message to the received information request message to the gateway 300 (S1445). The response message includes the temporary identifier (for example, SMS-ID) information allocated to the receiving terminal.

The gateway 300 extracts the short message encapsulated in the received SIP based message in the step 3 to transmit the extracted short message to the switcher (for example, SMS-IWMSC 500) (S1450).

For example, the gateway 300 may transmit the extracted short message to the SMS-IWMSC 500 by using a MAP-MO-FORWARD-SHORT-MESSAGE. In this case, the gateway 300 may set the temporary identifier of the receiving terminal acquired in the step 7 in the TP-DA field. Further, the gateway 300 may set the temporary identifier of the sending terminal included in the RP-Originator Address IE of the RP-DATA. Further, the gateway 300 may add a parameter indicating that the encapsulated temporary identifier value of the sending terminal is the identifier generated for the SMS.

The SMS-IWMSC 500 transmits the short message received from the gateway 300 to the SMS server (for example, SMS-SC 600) (S1455).

The SMS-SC 600 transmits an acknowledgment message (for example, submit report) to the SMS-IWMSC 500 (S1460). The acknowledgment message is transmitted to the gateway 300 through the SMS-IWMSC 500 (S1462).

The gateway 300 encapsulates the acknowledgment message in the SIP based message (for example, SIP MESSAGE request message) to transmit the encapsulated acknowledgment message to the session controller 200 (S1464). The session controller 200 transmits the SIP based message to the UE-1 100 (S1466).

The UE-1 100 receiving the acknowledgment message transmits the SIP based message (for example, SIP 200 OK message) as the response message thereto to the session controller 200 (S1470). The session controller 200 transmits the received response message to the gateway 300 (S1475).

Figure 15A:
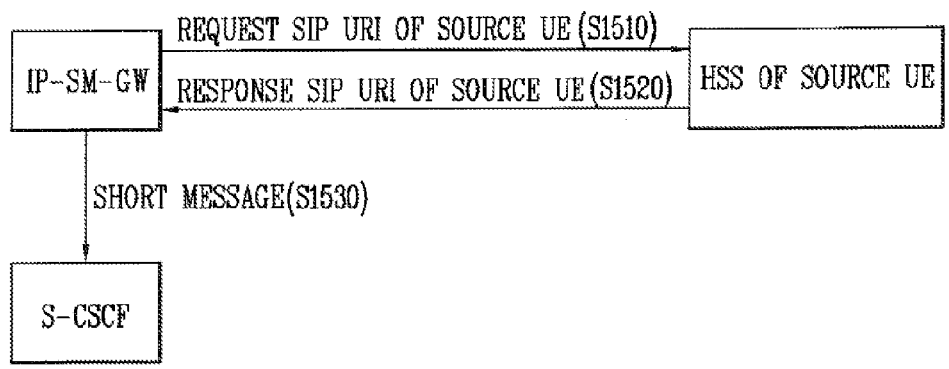
FIGS. 15a and 15b are diagrams illustrating a process of acquiring ID information of a short message sending terminal.
Figure 15B:
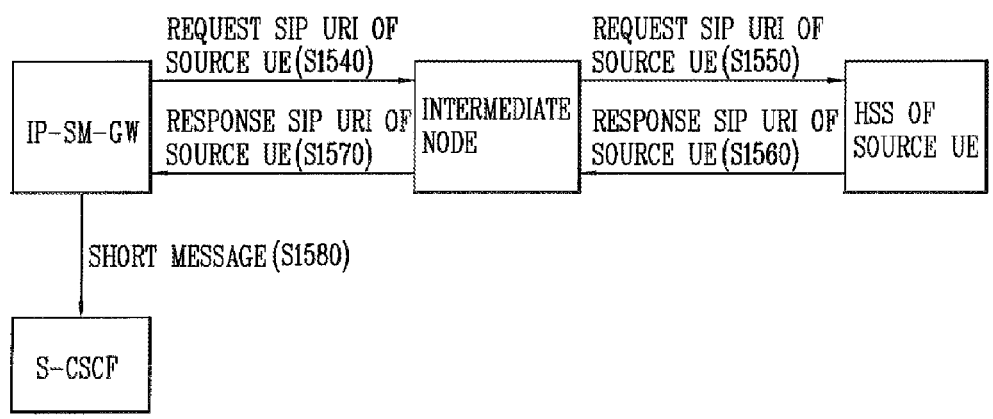

FIGS. 15a and 15b are diagrams illustrating a process of acquiring ID information of a short message sending terminal.

As illustrated in FIG. 14, when the IMS subscribing terminal without the mobile communication global unique number transmits the short message, the receiving terminal of the short message or the network entity serving as the receiving terminal needs to know that any terminal transmits the short message. For example, the receiving terminal or the network entity needs to know that an identifier (for example, SMS-ID) set to a TP originating address (TP-OA) representing an address of the originating SME encapsulated in the received short message is allocated to any terminal. A method of acquiring the ID information, that is, the SIP URI for the sending terminal of the short message by the receiving terminal or the network entity is as follows.

(1) Method of acquiring an ID (for example, SIP URI) of the sending terminal from a home subscriber server (for example, HSS) of the sending terminal by the gateway (for example, IP-SM-GW) serving as the receiving terminal When the gateway receives the short message toward the receiving terminal, the gateway acquires the ID of the sending terminal from the home subscriber server of the sending terminal by using a temporary identifier (for example, TP-OA value included in the SMS-ID or SMS-DELIVER type TPDU) of the short message sending terminal as illustrated in FIG. 15A (S1510, S1520). Thereafter, the gateway transmits the ID information included in the SIP based message (for example, SIP MESSAGE request) to the S-CSCF (S1530).

In FIG. 15A, the gateway sends and receives the message to and from the home subscriber server having the subscriber information of the sending terminal, but as illustrated in FIG. 15B, the gateway may acquire the ID information of the sending terminal through an intermediate node (S1540 to S1580).

The intermediate node may have a form adding the aforementioned function to the existing node, and may be a node newly defined for the present invention. Further, when the sending terminal and the receiving terminal belong to different providers, the gateway may also acquire the ID information of the sending terminal through an intermediate node (for example, T-intermediate node) in the home network to which the receiving terminal belongs and an intermediate node (for example, S-intermediate node) in the home network to which the sending terminal belongs.

In this case, the gateway may also acquire the ID information of the sending terminal through another node between the T-intermediate node and the S-intermediate node. Of course, even though the sending terminal and the receiving terminal belong to different providers, the intermediate node in the home network to which the receiving terminal belongs does not pass through the intermediate node in the home network to which the sending terminal belongs to acquire the ID information of the sending terminal from the home subscriber server to which the sending terminal belongs.

(2) Method of acquiring an ID (for example, SIP URI) of the sending terminal from a home subscriber server (for example, HSS) of the sending terminal by the IMS based session controller (for example, S-CSCF) serving as the receiving terminal When the IMS based session controller receives the short message toward the receiving terminal, the session controller acquires the ID of the sending terminal from the home subscriber server of the sending terminal by using a temporary identifier (for example, TP-OA value included in the SMS-ID or SMS-DELIVER type TPDU) of the short message sending terminal. Thereafter, the session controller transmits the ID information included in the SIP based message (for example, SIP MESSAGE request) to the S-CSCF.

This method is a method of replacing the gateway with the session controller in the method described in the (1). Accordingly, the detailed description follows the description of the (1).

(3) Method of acquiring ID information (for example, SIP URI) value of the sending terminal by subscribing a notification service notifying the ID information for the short message sending terminal by the receiving terminal For the method, the network needs to operate an entity or a functionality supporting the notification service, and the entity or the functionality may be added/extended to an existing entity or service and may also newly operate.

In the (1) and (2), the network entity serving as the receiving terminal acquires the ID information of the short message sending terminal, but unlike this, the receiving terminal may also directly acquire the information from the home subscriber server of the sending terminal. In this case, the methods described in the (1) and (2) may be applied.

Figure 16:
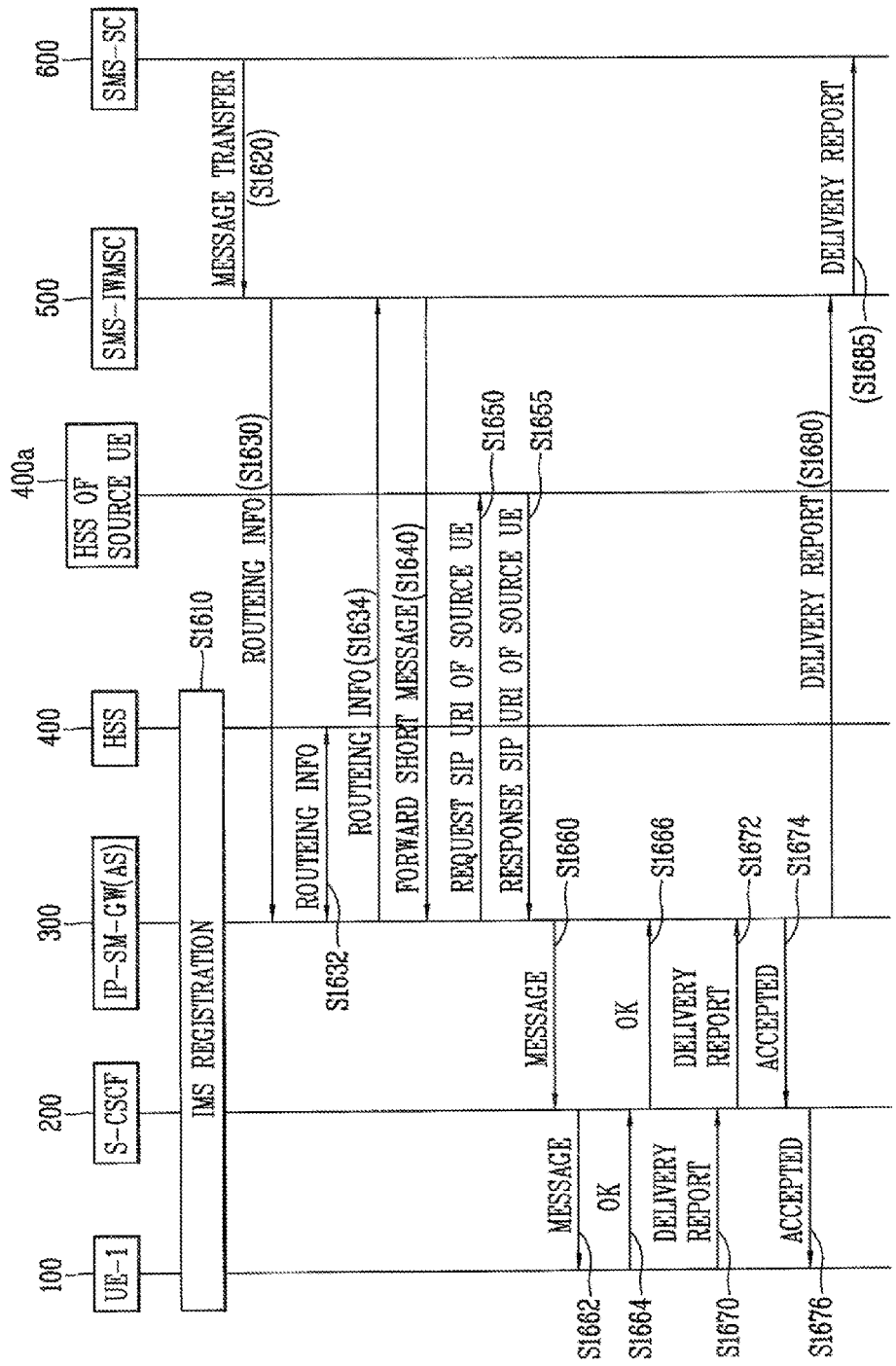
FIG. 16 is one embodiment of a process of receiving a short message according to the specification.

FIG. 16 is one embodiment of a process of receiving a short message according to the specification.

The embodiment is a process in which the short message sent by the IMS subscribing terminal without the mobile communication global unique number is transmitted to an IMS subscribing terminal UE-1 without the mobile communication global unique number. In the embodiment, it is assumed to use "(1) the method of acquiring an ID (for example, SIP URI) of the sending terminal from a home subscriber server (for example, HSS) of the sending terminal by the gateway (for example, IP-SM-GW) serving as the receiving terminal" among the methods of acquiring the ID information (for example, SIP URI) of the short message sending terminal.

1) The UE-1 100 performs registration in the IMS network according to the IMS registration procedure of FIGS. 10 to 12 (S1610). In this case, the UE-1 100 receives the temporary identifier. The temporary identifier is an identifier used for the SMS during the IMS registration valid period of the IMS subscribing terminal without the mobile communication global unique number. The temporary identifier may be the SMS-ID.

2) The SMS server (for example, SMS-SC 600) transmits the short message to a switcher (SMS-GMSC 500) (S1620). The SMS-GMSC 500 receiving the short message transmits a routing information request message to the home subscriber server (for example, HSS 400) of the receiving terminal in order to retrieve routing information (S1630). The HSS 400 transmits the routing information request message to the gateway 300, based on a pre-configured address of the gateway (for example, IP-SM-GW) for the UE-1 100 which is a receiver of the short message. In this case, the SMS-GMSC 500 may send a MAP-SEND-ROUTING-INFO-FOR-SM message including the MSISDN of the UE-1 100 which is the receiver of the short message to the HSS 400 in order to retrieve the routing information of the receiver of the short message.

The HSS 400 transmits to the gateway 300 an international mobile subscriber identity (IMSI) of the UE-1 100 which is the receiver of the short message (S1632). The gateway 300 generates an MT correlation ID bases on the IMSI value received from the HSS 400 and stores the generated MT Correlation ID together with the IMSI value. A detailed matter associated with the generation of the MT Correlation ID refers to a standard document 3GPP TS 23.040. The gateway 300 transmits to the SMS-GMSC 500 a routing Information response message including the generated MT Correlation ID and an address value thereof (S1634).

The SMS-GMSC 500 transmits the short message including the Correlation ID received from the gateway 300 to the gateway 300 (S1640). As an example, the SMS-GMSC 500 may transmit the short message to the gateway 300 by using a MAP-MT-FORWARD-SHORT-MESSAGE.

The gateway 300 performs service authorization based on the stored subscriber information. That is, the gateway 300 checks permitting the UE-1 100 which is the receiver of the short message to use a short message service. When the service authorization is succeeded, the gateway 300 transmits an ID information request message (for example, Request SIP URI message) of the sending terminal to an HSS 400a of the sending terminal in order to acquire the ID information for the short message sending terminal, for example, the SIP URI (S1650).

The HSS 400a of the sending terminal transmits a response message (for example, Response SIP URI message) to the ID information request message received from the gateway 300 to the gateway 300 (S1655). The response message may include SIP URI information of the sending terminal.

The gateway 300 encapsulates the received short message in the SIP based message (for example, SIP MESSAGE request message) to transmit the encapsulated short message to the IMS based session controller (for example, S-CSCF 200) (S1660). For example, a body of the SIP MESSAGE request message includes an RP-DATA, and the RP-DATA may include an SMS header encoded based on 3GPP TS 23.040 and SMS user information.

The gateway 300 sends the ID information of the sending terminal included in the SIP based message to the session controller 200. In this case, for example, SIP URI information of the sending terminal may be included by using one or more parameters among a header field of the SIP, a body parameter of the header field of the SIP, a tag of the header field of the SIP, a field of the SDP, and an extensible markup language (XML) body.

The session controller 200 transmits the SIP based message received from the gateway 300 to the UE-1 100 (S1662). The UE-1 100 receiving the SIP based message transmits a response message (for example, SIP 200 OK message) thereto to the session controller 200 (S1664). The session controller 200 transmits the response message to the gateway 300 (S1666).

Further, the UE-1 100 transmits a delivery report (for example, Delivery Report) including a response (positive or negative) to the received short message to the session controller 200 (S1670). The session controller 200 transmits the delivery report to the gateway 300 (S1672).

The gateway 300 transmits a response message (for example, SIP 202 Accepted message) to the delivery report to the session controller 200 (S1674). The session controller 200 transmits the received response message to the UE-1 100 (S1676).

Further, the gateway 300 transmits the delivery report to the SMS-GMSC 500 (S1680). The SMS-GMSC 500 transmits the delivery report to the SMS-SC 600 (S1685).

Figure 17:
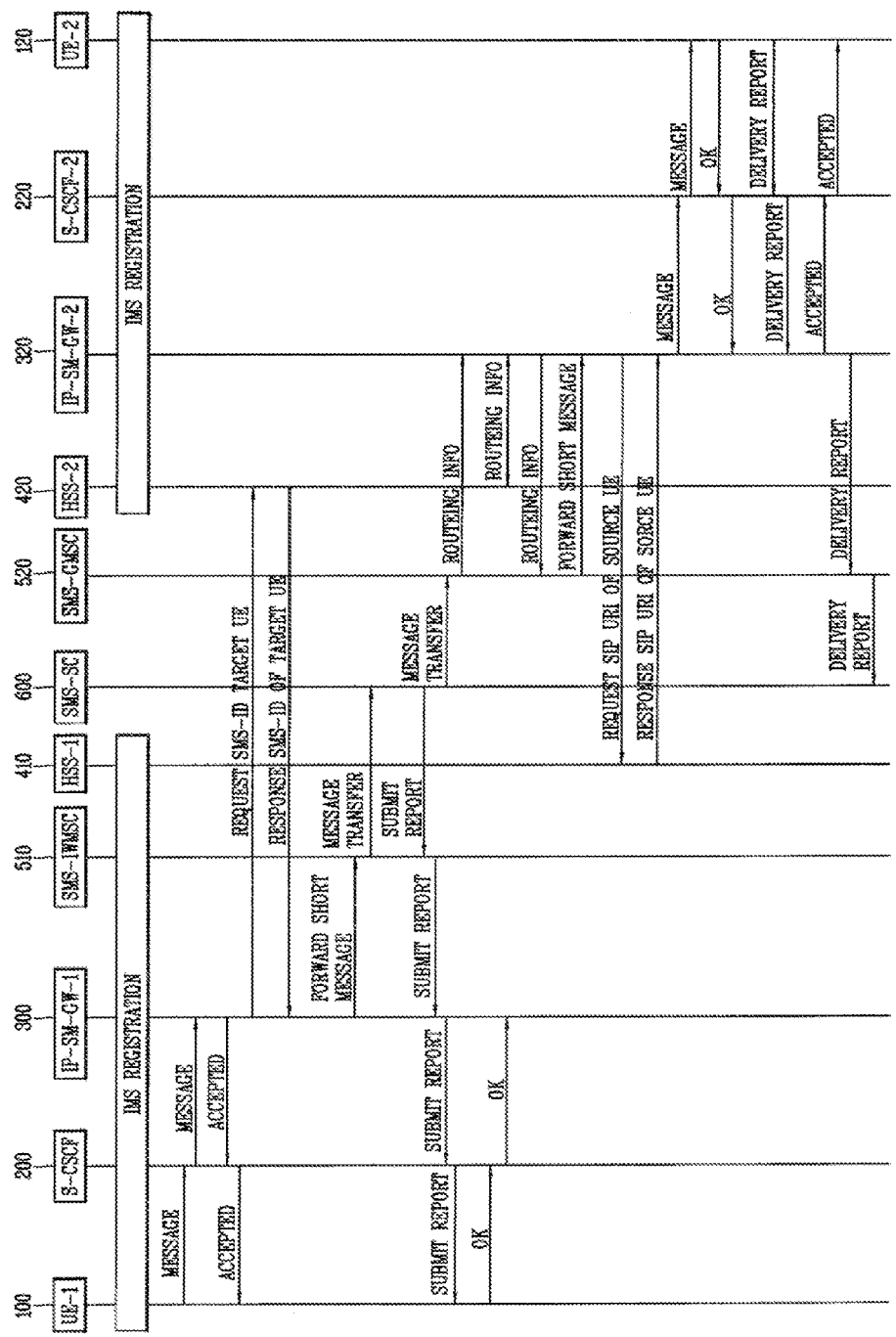
FIG. 17 is one embodiment of a process of transmitting and receiving a short message according to the specification.

FIG. 17 is one embodiment of a process of transmitting and receiving a short message according to the specification.

FIG. 17 illustrates an entire process in which a short message sent by an IMS subscribing terminal UE-2 without a mobile communication global unique number is transferred to the IMS subscribing terminal UE-1 without the mobile communication global unique number.

The process illustrated in the embodiment is the same as described in FIGS. 14 and 16.

The embodiment of the present invention may be applied to not only the IMS subscribing terminal but also an IMS non-subscribing terminal. In this case, as if the IMS subscribing terminal allocates the SMS-ID during the IMS registration, in the case of the terminal, one (for example, node such as SGSN and MME) of nodes participating in an access procedure during network accessing allocates the SMS-ID for the terminal to notify the allocated SMS-ID to the HLR/HSS. In this case, the SMS is not performed through an IMS domain but performed through a PS domain, and a switching method of the short message between UEs belonging to the proposed IMS subscriber may be applied in the same manner.

Figure 18:
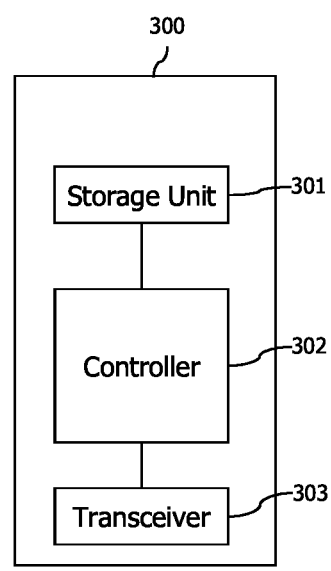
FIG. 18 is an internal block diagram of a gateway according to an embodiment of the specification.

FIG. 18 is an internal block diagram of a gateway according to an embodiment of the specification. The gateway 300 interworking messages of heterogeneous protocols for the sending terminal may be the IP-SM-GW.

As illustrated in FIG. 18, the gateway 300 includes a storage unit 301, a controller 302, and a transmitting/receiving unit 303.

The storage unit 301 stores the methods illustrated in FIGS. 9 to 17.

The controller 302 controls the storage unit 301 and the transmitting/receiving unit 303. In detail, the controller 302 performs the methods stored in the storage unit 301, respectively. In addition, the controller 302 transmits the aforementioned signals and/or messages through the transmitting/receiving unit 303.

The controller 302 may include an application-specific integrated circuit (ASIC), another chip set, a logic circuit and/or a data processing apparatus. The storage unit 301 may include a read-only memory (ROM), a random access memory (RAM), a flash memory, a memory card, a storage medium and/or other storage devices. The transmitting/receiving unit 303 may include a baseband circuit for processing a radio signal. When the embodiment is implemented by software, the aforementioned method may be implemented by a module (process, function, and the like) performing the aforementioned function. The module is stored in the storage unit 301 and may be performed by the controller 302.

The storage unit 301 may be disposed inside or outside the controller 302, and be connected with the controller 302 as various well-known means.

The aforementioned embodiments are acquired by combining the components and features of the present invention in a predetermined format. It should be considered that each component or feature is selective if not additionally clearly mentioned. Each component or feature may be implemented while being not combined with other components or features. Further, some components and/or features are combined to configure the embodiment of the present invention. A sequence of the operations described in the embodiments of the present invention may be changed. Some components or features of any embodiment may be included in another embodiment or replaced with corresponding components or features of another embodiment.

The present invention may be implemented in another specific form within the scope without departing from the spirit and essential feature of the present invention. Therefore, the detailed description should not limitatively be analyzed in all aspects and should be exemplarily considered. The scope of the present invention should be determined by rational interpretation of the appended claims and all changes are included in the scope of the present invention within the equivalent scope of the present invention. Further, claims having no clear quoting relation in the claims are combined to configure the embodiment or may be included as new claims by correction after application.

The invention claimed is:

1. A method for processing a message, the method performed by a gateway for interworking messages of heterogeneous protocols for a sending terminal and comprising:
   acquiring a temporary identifier of the sending terminal when the sending terminal has subscribed in an IP multimedia subsystem (IMS) without being allocated with a mobile subscriber integrated services digital network number (MSISDN), wherein the temporary identifier of the sending terminal is used for transmitting a short message during an IMS registration valid period of the sending terminal;
   receiving, from an IMS based session controller, a session initiation protocol (SIP) based message generated by the sending terminal, wherein the received SIP based message includes an encapsulated short message service (SMS) based message which includes no MSISDN of the sending terminal and a receiving terminal;
   acquiring a temporary identifier of the receiving terminal on a basis of an SIP based identifier of the receiving terminal encapsulated in the SIP based message;
   regenerating the SMS based message on a basis of the received SIP based message, the temporary identifier of the receiving terminal, and the temporary identifier of the sending terminal; and
   transmitting the generated SMS based message to a switcher,
   wherein the regenerating of the SMS based message includes:
      decapsulating the SMS based message encapsulated in the received SIP based message; and
      adding the temporary identifier of the receiving terminal and the temporary identifier of the sending terminal to the decapsulated SMS based message.

2. The method of claim 1, wherein the acquiring of the temporary identifier of the sending terminal includes, receiving the temporary identifier of the sending terminal which a home subscriber server (HSS) of the sending terminal has allocated during an IMS registration procedure.

3. The method of claim 1, wherein the acquiring of the temporary identifier of the sending terminal includes, receiving the temporary identifier of the sending terminal which the IMS based session controller has allocated during the IMS registration procedure.

4. The method of claim 1, wherein the acquiring of the temporary identifier of the sending terminal includes, acquiring the temporary identifier which the gateway has allocated through the IP multimedia subsystem (IMS) registration procedure.

5. The method of claim 1, wherein the temporary identifier includes a country code (CC) field, a national destination code (NDC) field, and a subscriber number (SN) field, and
   the SN field is generated arbitrarily or sequentially or based on an instance ID transmitted which the sending terminal transmits in IMS registration or based on subscriber information of the sending terminal.

6. The method of claim 5, wherein the NDC field is generated differently for each gateway.

7. The method of claim 1, wherein the temporary identifier is generated on basis of an international mobile subscriber identity (IMSI) or an integrated circuit card ID (ICCID) of the terminal.

8. The method of claim 1, wherein the acquiring of the temporary identifier of the receiving terminal includes receiving, by the gateway, the temporary identifier from a home subscriber server (HSS) of the receiving terminal.

9. The method of claim 1, wherein the acquiring of the temporary identifier of the receiving terminal includes:
   acquiring, by the IMS based session controller, the temporary identifier of the receiving terminal from a home subscriber server (HSS) of the receiving terminal; and
   acquiring, by the gateway, the temporary identifier of the receiving terminal from the IMS based session controller.

10. A gateway for interworking messages of heterogeneous protocols for a sending terminal, the gateway comprising:
   a transceiver configured to transmit/receive a signal to/from the outside; and
   a controller connected with the transceiver,
   wherein the controller is configured to:
      control the transceiver to acquire a temporary identifier of the sending terminal when the sending terminal has subscribed in an IP multimedia subsystem (IMS) without being allocated with a mobile subscriber integrated services digital network number (MSISDN), the temporary identifier of the sending terminal being used for transmitting a short message during an IMS registration valid period of the sending terminal;
      control the transceiver to receive a session initiation protocol (SIP) based message generated by the sending terminal from an IMS based session controller, wherein the received SIP based message includes an encapsulated short message service (SMS) based message which includes no MSISDN of the sending terminal and a receiving terminal;
      control the transceiver to acquire a temporary identifier of the receiving terminal, on a basis of an SIP based identifier of the receiving terminal encapsulated in the SIP based message;
      regenerate the SMS based message on a basis of the received SIP based message, the temporary identifier of the receiving terminal, and the temporary identifier of the sending terminal; and
      control the transceiver to transmit the generated SMS based message to a switcher, wherein, to regenerate the SMS based message, the controller is further configured to:
  decapsulate the SMS based message encapsulated in the received SIP based message; and
  add the temporary identifier of the receiving terminal and the temporary identifier of the sending terminal to the decapsulated SMS based message to generate the SMS based message.

* * * * *